(12) United States Patent
Lee et al.

(10) Patent No.: US 10,971,053 B2
(45) Date of Patent: Apr. 6, 2021

(54) ELECTRONIC DEVICE FOR CHANGING CHARACTERISTICS OF DISPLAY ACCORDING TO EXTERNAL LIGHT AND METHOD THEREFOR

(71) Applicant: Samsung Electronics Co., Ltd., Suwon-si (KR)

(72) Inventors: Sungjun Lee, Suwon-si (KR);
Byeongjun Mun, Suwon-si (KR);
Jinyoung Ahn, Suwon-si (KR);
Sanghyun Lee, Suwon-si (KR);
Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/733,768

(22) Filed: Jan. 3, 2020

(65) Prior Publication Data

US 2020/0219431 A1    Jul. 9, 2020

(30) Foreign Application Priority Data

Jan. 3, 2019    (KR) .......................... 10-2019-000636

(51) Int. Cl.
*G09G 3/20* (2006.01)
*G02B 27/01* (2006.01)

(52) U.S. Cl.
CPC ....... *G09G 3/2003* (2013.01); *G02B 27/0172* (2013.01); *G02B 2027/014* (2013.01);
(Continued)

(58) Field of Classification Search
CPC ......... G09G 3/2003; G09G 2320/0666; G09G 2340/12; G09G 2354/00; G09G 2360/144;
(Continued)

(56) References Cited

U.S. PATENT DOCUMENTS 8,976,085 B2    3/2015   Olsson et al.
9,529,197 B2    12/2016  Olsson et al.
(Continued)

FOREIGN PATENT DOCUMENTS

JP         2017523481 A       8/2017
KR    10-2017-0115367 A      10/2017
(Continued)

OTHER PUBLICATIONS

International Search Report dated Apr. 28, 2020, issued in an International Application No. PCT/KR2020/000141.

*Primary Examiner* — Robert J Michaud
(74) *Attorney, Agent, or Firm* — Jefferson IP Law, LLP

(57) ABSTRACT

An electronic device for controlling a display based on luminance of external light and a method therefor are provided. The electronic device includes a display, a sensor, a memory, and a processor operably connected to the display, the sensor, and the memory. The processor is configured to identify first information regarding external light directed to the electronic device, acquire first frame data based on the identified first information and second information regarding the user, display the first frame data on the display, identify second frame data distinguished from the first frame data from an application stored in the memory while the first frame data is outputted on the display, adjust color of at least one of multiple pixels included in the second frame data at least partially based on the first frame data, and control the display based on the first frame data or the adjusted second frame data.

20 Claims, 24 Drawing Sheets

(52) U.S. Cl.
CPC ........... *G02B 2027/0112* (2013.01); *G09G 2320/0666* (2013.01); *G09G 2340/12* (2013.01); *G09G 2354/00* (2013.01); *G09G 2360/144* (2013.01)

(58) Field of Classification Search
CPC ........ G02B 27/0172; G02B 2027/0112; G02B 2027/014
See application file for complete search history.

(56) References Cited

U.S. PATENT DOCUMENTS

| | | | |
|---|---|---|---|
| 2016/0270656 A1* | 9/2016 | Samec | A61B 3/022 |
| 2017/0323482 A1* | 11/2017 | Coup | H04N 13/363 |

FOREIGN PATENT DOCUMENTS

| | | | |
|---|---|---|---|
| KR | 20170115367 A | * | 10/2017 |
| KR | 101885473 B1 | | 8/2018 |
| KR | 20180105401 A | | 9/2018 |

\* cited by examiner

| | N + 1 | | | | | | | | | | | | |
|---|---|---|---|---|---|---|---|---|---|---|---|---|---|
| | $R_{00}$ | $G_{00}$ | $B_{00}$ | $A_{00}$ | $R_{01}$ | $G_{01}$ | $B_{01}$ | $A_{01}$ | ⋯ | $R_{0N}$ | $G_{0N}$ | $B_{0N}$ | $A_{0N}$ |
| | $R_{10}$ | $G_{10}$ | $B_{10}$ | $A_{10}$ | $R_{11}$ | $G_{11}$ | $B_{11}$ | $A_{11}$ | ⋯ | $R_{1N}$ | $G_{1N}$ | $B_{1N}$ | $A_{1N}$ |
| M + 1 | ⋮ | | | | ⋮ | | | | ⋮ | ⋮ | | | |
| | $R_{M0}$ | $G_{M0}$ | $B_{M0}$ | $A_{M0}$ | $R_{M1}$ | $G_{M1}$ | $B_{M1}$ | $A_{M1}$ | ⋯ | $R_{MN}$ | $G_{MN}$ | $B_{MN}$ | $A_{MN}$ |

FIG.8

ELECTRONIC DEVICE FOR CHANGING CHARACTERISTICS OF DISPLAY ACCORDING TO EXTERNAL LIGHT AND METHOD THEREFOR

CROSS-REFERENCE TO RELATED APPLICATION(S)

This application is based on and claims priority under 35 U.S.C. § 119 of a Korean patent application number 10-2019-0000636, filed on Jan. 3, 2019, in the Korean Intellectual Property Office, the disclosure of which is incorporated by reference herein in its entirety.

BACKGROUND

1. Field

The disclosure relates to an electronic device for controlling a display based on luminance of external light and a method therefor.

2. Description of Related Art

In recent years, with the rapid development of an electronic device such as a smartphone and a tablet Personal Computer (PC), the electronic device, which can perform wireless voice calling and information exchange, has become a daily necessity. The electronic device has been recognized simply as a portable apparatus capable of wireless voice calling. However, with the development of the technology thereof and the introduction of wireless Internet, the electronic device has been developed into a multimedia apparatus performing functions such as scheduling, games, remote control, image photography, Internet searching, and an Social Network Service (SNS) in addition to the wireless voice call, thereby satisfying the needs of users.

In particular, electronic devices for providing an augmented reality service have recently become available. The augmented reality service refers to a service for showing users real world images overlaid with virtual images having additional information, and can provide users with virtual images including content associated with external objects distinguished from the real-world images.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for controlling a display based on luminance of external light and a method therefor.

When a user is provided with an augmented reality service by displaying content associated with external light on a display that transmits the external light in an overlapping manner, the brightness of the external light may determine whether or not the user can see the content. For example, when relatively bright external light reaches the user, the visibility of content displayed to the user may be reduced.

The technical subjects pursued in the disclosure may not be limited to the above-mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a display, a sensor, a memory, and at least one processor operably connected to the display, the sensor, and the memory. The at least one processor is configured to, identify first information regarding external light directed to the electronic device by using the sensor, in response to identifying wearing of the electronic device on a user, acquire first frame data based on the identified first information and second information regarding the user, display the first frame data on the display in response to acquisition of the first frame data, identify second frame data distinguished from the first frame data from an application stored in the memory while the first frame data is outputted on the display, adjust color of at least one of multiple pixels included in the second frame data at least partially based on the first frame data, in response to identification of the second frame data, and control the display based on at least one of the first frame data or the adjusted second frame data.

In accordance with another aspect of the disclosure, an electronic device is provided. The electronic device includes a display, a sensor, a memory, and at least one processor operably connected to the display, the sensor, and the memory. The at least one processor is configured to, identify first external light directed to the electronic device by using the sensor, display content having first color associated with the first external light on the display that transmits the first external light, based on identification of the first external light, the content being acquired from an application executed by the at least one processor, identify second external light distinguished from the first external light by using the sensor, while content based on the first color is outputted, and change color of the content outputted on the display from the first color to second color associated with the second external light, in response to identification of the second external light.

In accordance with yet another aspect of the disclosure, a method of an electronic device is provided. The method includes identifying whether or not a user of the electronic device wears the electronic device identifying first information indicating luminance of external light directed to the electronic device by using a sensor of the electronic device, in response to identifying wearing of the electronic device on the user, acquiring first frame data based on the identified first information and second information regarding the user, outputting the first frame data on a display of the electronic device in response to acquisition of the first frame data, identifying second frame data distinguished from the first frame data from an application stored in a memory of the electronic device, while the first frame data is outputted on the display, adjusting color of at least one of multiple pixels included in the second frame data at least partially based on the first frame data, in response to identification of the second frame data, and controlling the display based on at least one of the first frame data or the adjusted second frame data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram illustrating multiple pixels included in first frame data generated by an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
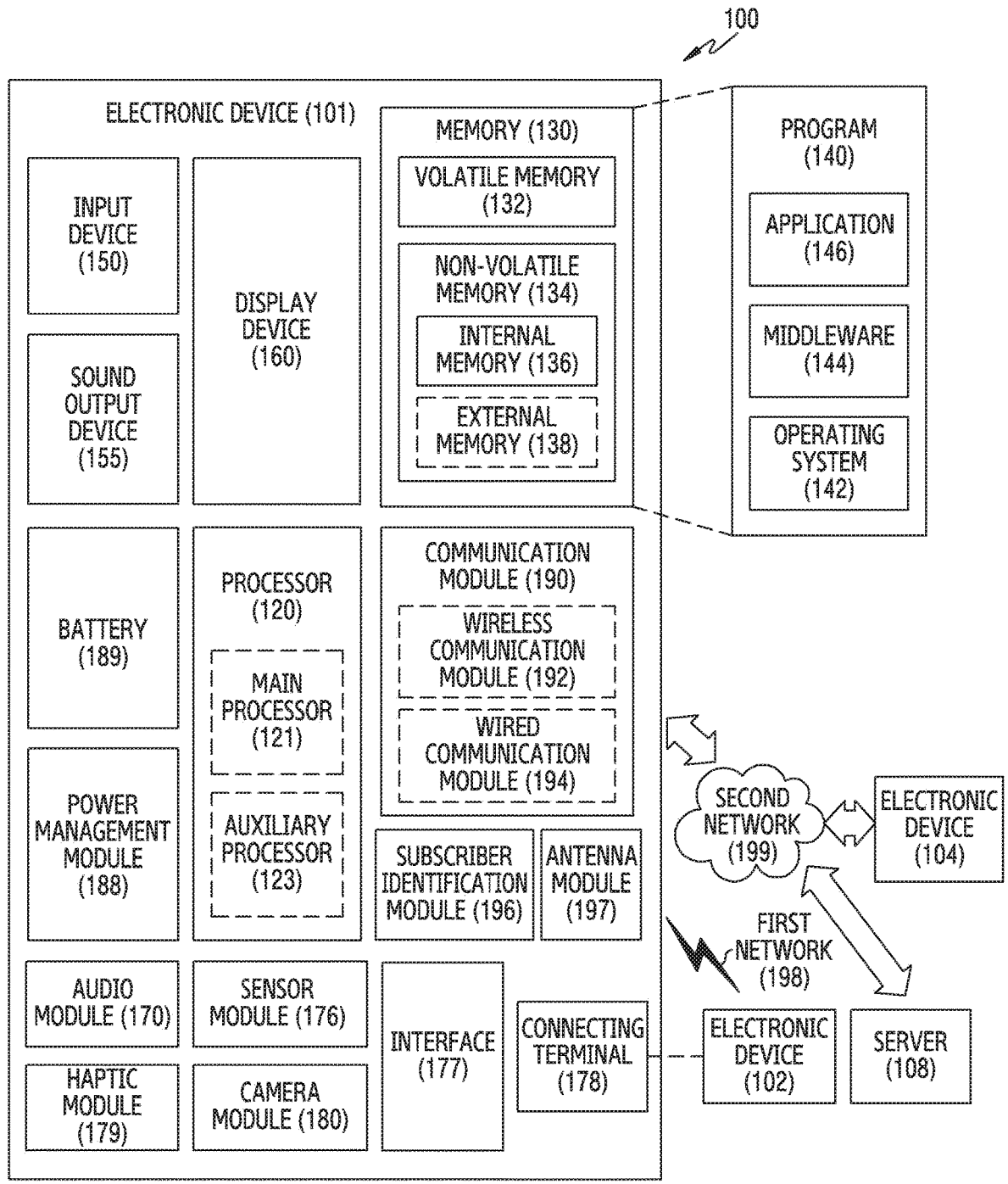
FIG. 1 is a block diagram of an electronic device inside a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
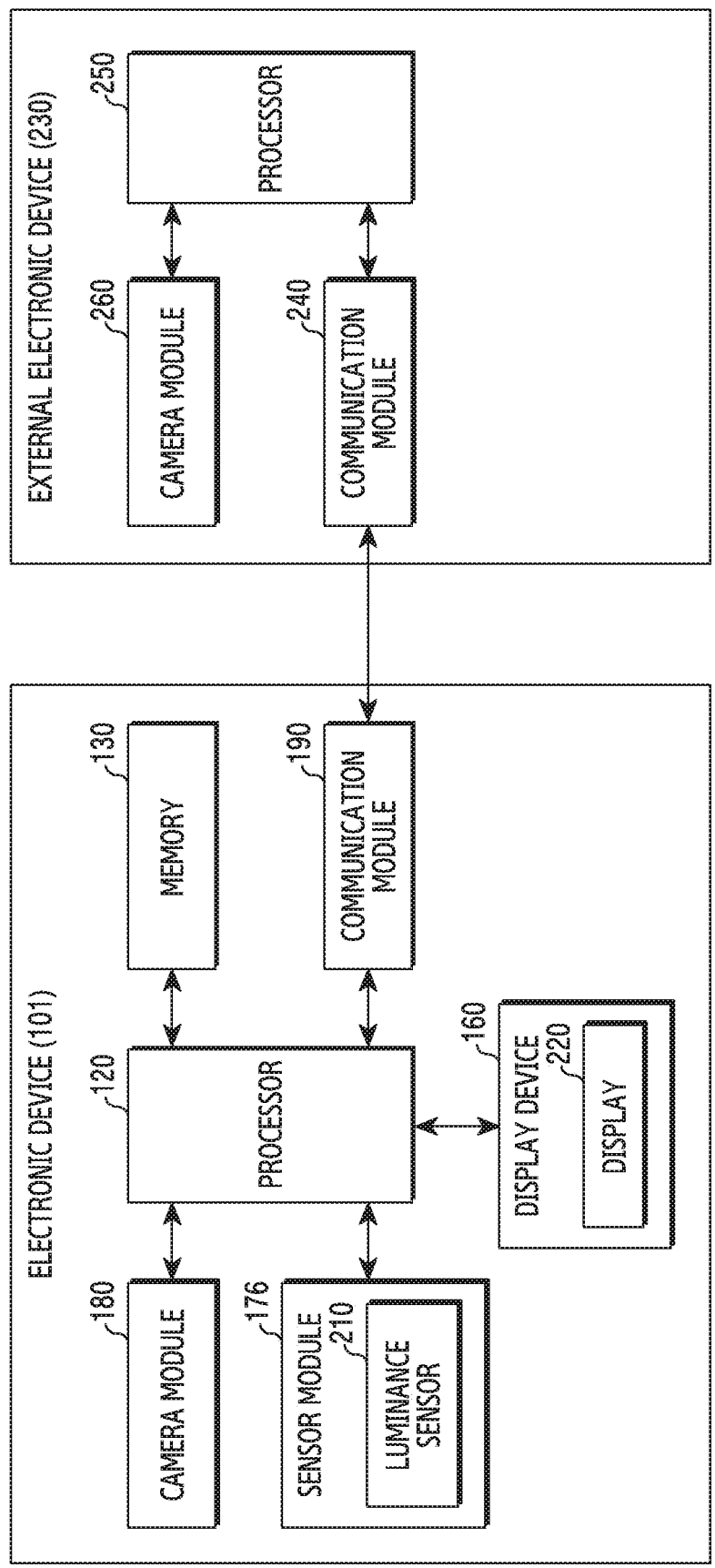
FIG. 2 is a block diagram of an electronic device and an external electronic device according to an embodiment of the disclosure.

FIG. 2 is a block diagram of an electronic device 101 and an external electronic 230 device according to an embodiment of the disclosure.

The electronic device 101 may correspond to a wearable device including at least one of an accessory-type device (for example, a watch, a ring, a bracelet, an anklet, a necklace, glasses, contact lenses, or a head-mounted device (HMD)), a fabric or garment-integrated device (for example, an electronic garment), a body-attached device (for example, a skin pad or a tattoo), or a bio-implantable device (for example, an implantable circuit). An example of the electronic device 101 corresponding to a wearable device will be described later with reference to FIGS. 4A to 4B. In an embodiment, the electronic device 101 may correspond to at least one of a smartphone, a smart pad, a tablet PC, a person digital assistance (PDA), a laptop PC, or a desktop PC. An example of the electronic device 101 corresponding to a smartphone or a smart pad will be described later with reference to FIGS. 17 to 18.

Referring to FIG. 2, the electronic device 101 according to various embodiments may include at least one of a processor 120, a memory 130, a sensor module 176, a camera module 180, a communication module 190, or a display device 160. The electronic device 101 in FIG. 2 and hardware components included therein may correspond to the electronic device 101 in FIG. 1 and the hardware components included therein. The processor 120, the memory 130, the sensor module 176, the camera module 180, the communication module 190, or the display device 160 may be operably or electrically connected to each other through a communication bus (not illustrated), for example.

According to various embodiments, the camera module 180 may include multiple photodiodes (PDs) configured to identify external light reaching the camera module 180 based on the photoelectric effect. Each of the multiple photodiodes may output an electric signal corresponding to the external light. The camera module 180 may output a data set including multiple electric signals outputted from the multiple PDs based on a designated cycle (for example, 12 Hz, 60 Hz, or 120 Hz). The cycle may be associated with the frame per second (FPS) of the camera module 180. Hereinafter, the data set outputted from the camera module 180 will be referred to as image data.

According to various embodiments, the sensor module 176 may include at least one sensor configured to output an electric signal associated with the result of measuring the peripheral environment of the electronic device 101. For example, the sensor module 176 may include a luminance sensor 210 configured to measure the intensity of illumination (luminance) of external light directed to the electronic device. At least one of the luminance measured by the luminance sensor 210 or the image data acquired by the camera module 180 may be delivered to the processor 120 of the electronic device 101.

According to various embodiments, the processor 120 may execute at least one instruction stored in the memory 120. The processor 120 may include a circuit for processing data, for example, at least one of an integrated circuit (IC), an arithmetic logic unit (ALU), a field programmable gate array (FPGA), and a large-scale integration (LSI). Data processed by the processor 120 may include, for example, at least one of the luminance measured by the luminance sensor 210 or the image data acquired by the camera module 180.

According to various embodiments, the memory 130 may store data regarding the electronic device 101. The memory 130 may include a volatile memory such as a random access memory (RAM), including a static random access memory (SRAM) or a dynamic RAM (DRAM), or may include a nonvolatile memory such as a read only memory (ROM), a magnetoresistive RANI (MRAM), a spin-transfer torque MRAM (STT-MRAM), a phase-change RAM (PRAM), a resistive RAM (RRAM), a ferroelectric RAM (FeRAM), a flash memory, an embedded multimedia card (eMMC), or a solid state drive (SSD).

According to various embodiments, the memory 130 may store an instruction regarding an application and an instruction regarding an operating system (OS). The OS may be included in system software executed by the processor 120. By executing the OS, the processor 120 may manage hardware components included in the electronic device 101. The OS may provide an application programming interface (API) with an application corresponding to the other software than the system software.

According to various embodiments, at least one application, which is a set of multiple applications, may be installed in the memory 130. The fact that an application is installed in the memory 130 means that the application is stored in such a format that the same can be executed by the processor 120 connected to the memory 130. Based on an application for providing an augmented reality service, the electronic device 101 may identify at least one external object from image data acquired from the camera module 180.

According to various embodiments, the display device 160 may include at least one display 220 configured to visually output information to the user by using at least one of organic light-emitting diodes (OLED), a liquid crystal display (LCD), and light-emitting diodes (LED). The information outputted by the electronic device 101 may include, for example, information regarding at least one external object identified from the image data. The display 220 may include a touch screen panel (TSP) disposed on the surface of the display 220 such that a user interface (UI) displayed on the display 220 can be controlled more intuitively by the user. The TSP may detect the position of an object (for example, the user's finger or a stylus) touching the display device 160 or hovering above the display device 160 by using at least one of a resistive film, capacitive components, surface acoustic waves, and infrared waves.

According to various embodiments, the display 220 may include a panel configured to transmit at least a part of external light reaching the first surface thereof to a second surface opposite to the first surface. In an embodiment, the display 220 may correspond to an HMD attachable to the user's head, or a head-up display (HUD) disclosed toward one side of the user's head. The second surface of the panel may face the user's eyes, and external light reaching the first surface may pass through the panel such that the same is delivered to the user's eyes. The extent to which the panel transmits external light (for example, transparency) may be adjusted based on a control signal from the processor 120. An embodiment of the electronic device 101 attached to the user's head and an embodiment of the structure of the display 220 will be described later with reference to FIGS. 4A to 4B.

According to various embodiments, the processor 120 may display a UI on the panel such that the UI is superimposed on an external object viewed by the user. The UI may be generated based on an application for providing an augmented reality service. According to various embodiments, the processor 120 may change the color and/or transparency of the UI displayed on the panel of the display 220, based on luminance measured by the luminance sensor 210. The processor 120 may change the color and/or transparency of the entire panel based on luminance measured by the luminance sensor 210.

According to various embodiments, the processor 120 may determine the color and/or transparency of the UI displayed on the entire panel or on a part of the panel, based on luminance measured by the luminance sensor 210, information regarding the user, or a combination thereof. The information regarding the user may include, for example, information regarding at least one of the user's color weakness and/or color blindness. An embodiment of operations of the processor 120 determining the color and/or transparency of the UI displayed on the entire panel or on a part of the panel, based on at least one of the luminance or the information, will be described later with reference to FIG. 3.

According to various embodiments, the communication module 190 may connect the electronic device 101 to the external electronic device 230 based on a wireless network, such as Bluetooth, Wireless Fidelity (Wi-Fi), near field communication (NFC), or Long Term evolution (LTE), and a wired network such as a local area network (LAN) or Ethernet. The communication module 190 may include at least one of a communication circuit supporting a wireless network or a wired network, a communication processor (CP), and a communication interface.

Referring to FIG. 2, the external electronic device 230 according to various embodiments may include at least one of a communication module 240, a processor 250, or a memory 260. The communication module 240, the processor 250, and the memory 260 may include hardware components similar to those of the communication module 190, the processor 120, and the memory 130 included in the electronic device 101, respectively. The communication module 240, the processor 250, or the memory 260 may be electrically or operably connected to each other through a communication bus (not illustrated), for example.

According to various embodiments, the electronic device 101 and the external electronic device 230 may be connected to each other through a wireless or wired network based on the communication modules 190 and 240. Through the wired or wireless network, the electronic device 101 may transmit information regarding the user, which is used to determine the color and/or transparency of the UI displayed on the entire panel or on a part of the panel. Operations performed by the electronic device 101 and the external electronic device 230 based on the information will be described later with reference to FIG. 14.

According to various embodiments, the electronic device 101 may adjust the color and/or transparency of the entire area of the display 220 while providing content based on augmented reality, which is displayed inside the display 220, towards both eyes of the user together with external light passing through the display 220, in order to prevent a situation in which the user cannot see the content due to the external light, or a situation in which the user cannot see the external light due to the content. According to various embodiments, the electronic device 101 may adjust the color and/or transparency of the entire area of the display 220 such that user can distinguish multiple colors in spite of color blindness and/or color weakness. According to various embodiments, the electronic device 101 may adjust the color of the content based on the adjusted color and/or transparency of the entire area of the display 220. For example, the electronic device 101 may change the color of the content to the complementary color of the color of the entire area of the display 220. However, this is only an example, and embodiments are not limited thereto. For example, the electronic device 101 may also adjust the color and/or transparency of a partial area of the display 220.

Figure 3:
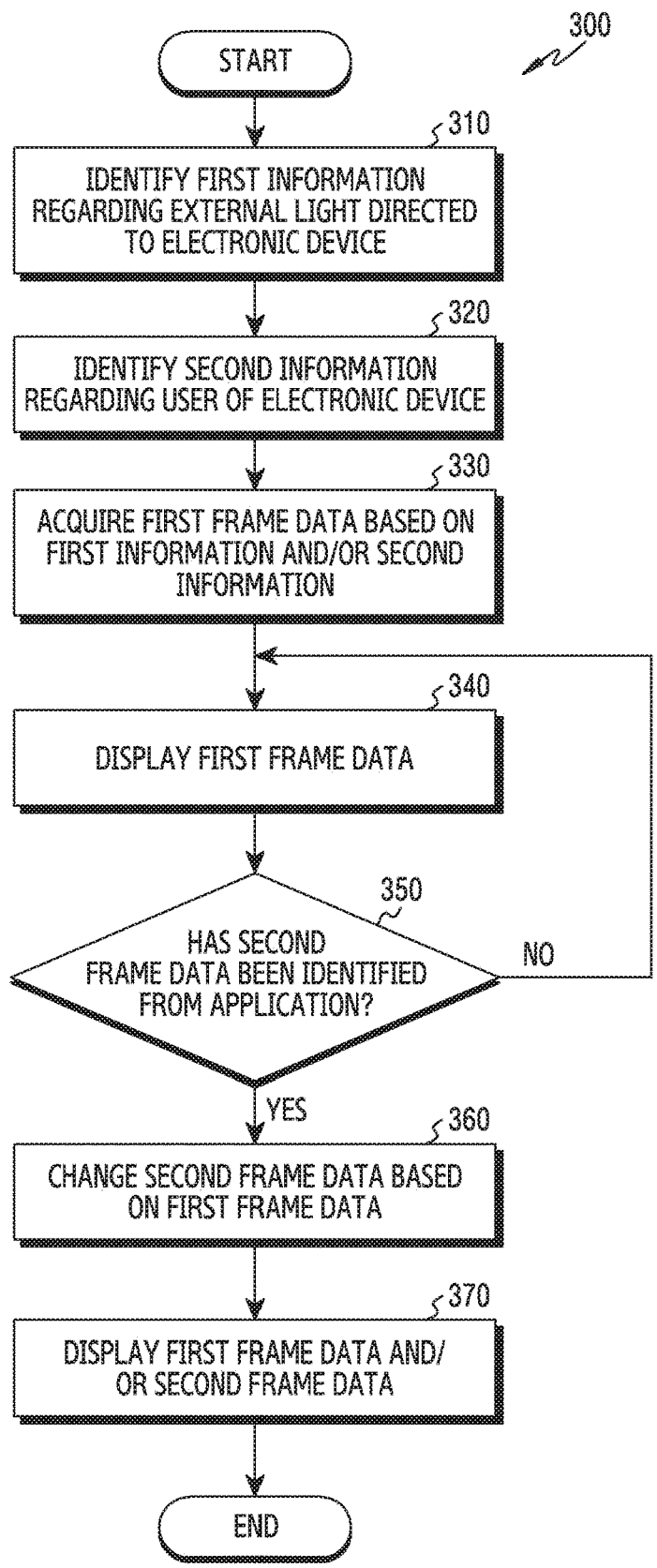
FIG. 3 is a flowchart illustrating operations of an electronic device according to an embodiment of the disclosure.

FIG. 3 is a flowchart 300 illustrating operations of an electronic device according to an embodiment of the disclosure. The electronic device in FIG. 3 may correspond to the electronic device 101 in FIGS. 1 to 2. The operations in FIG. 3 may be performed by the electronic device 101 in FIGS. 1 to 2 or by the processor 120 in FIGS. 1 to 2, for example.

Referring to FIG. 3, in operation 310, the electronic device according to various embodiments may identify first information regarding external light directed to the electronic device. In an embodiment, operation 310 may be performed in response to execution of an application associated with an augmented reality service by the electronic device. Alternatively, in an embodiment in which the electronic device corresponds to a wearable device, operation 310 may be performed based on whether or not the user of the electronic device wears the electronic device.

The external light directed to the electronic device may be identified based on at least one sensor included in the electronic device. For example, the external light may be light directed to the luminance sensor that is viewable through at least a part of the housing of the electronic device. For example, the external light may be light directed to the camera module that is viewable through at least a part of the housing of the electronic device.

The first information identified based on the external light may include a parameter measured by at least one sensor included in the electronic device. For example, the first information may include at least one parameter obtained from the luminance sensor (for example, the luminance sensor 210 in FIG. 2) included in the electronic device, the camera module (for example, the camera module 180 in FIGS. 1 to 2), or a combination thereof. For example, the first information may include the luminance of the external light. For example, the first information may include an image that is two-dimensionally received on an image sensor of the camera module.

In operation 320, the electronic device according to various embodiments may identify second information regarding the user. The second information may include one or more parameters that has been stored in the memory of the electronic device. For example, the second information may include one or more parameters associated with at least one of the user's color weakness and/or color blindness. In an embodiment, the second information may include at least one of the type, the frequency, and the identifier of multiple colors that the user cannot distinguish, or a combination thereof. In an embodiment, the second information may include at least one of the type, the frequency, and the identifier of one or more colors that the user cannot distinguish, or a combination thereof. In an embodiment, the second information may include at least one of the type, the frequency, and the identifier of a designated color for correcting color weakness and/or color blindness of the user, or a combination thereof. The second information is not limited to the above-mentioned examples, and an embodiment of the operation of the electronic device identifying second information regarding the user will be described later with reference to FIG. 15.

In operation 330, the electronic device according to various embodiments may acquire first frame data based on the first information and the second information. The size and/or resolution of the first frame data may correspond to the size and/or resolution of the entire area of the display included in the electronic device. The first frame data may include multiple pixels. The color and transparency of the multiple pixels included in the first frame data may be determined based on the first information and the second information.

In an embodiment, the color of the multiple pixels of the first frame data may be determined based on the second information regarding the user (for example, color designated based on the user's preferences, color designated to correct the user's color weakness and/or color blindness). In an embodiment, the transparency of the multiple pixels of the first frame data may be determined based on the luminance of external light included in the first information. Embodiments performed by the electronic device in connection with operation 330 will be described later with reference to FIGS. 7A to 7B.

In response to acquisition of the first frame data, the electronic device according to various embodiments may display the first frame data on the display in operation 340. In an embodiment in which the electronic device corresponds to a wearable device, the display may be disposed adjacent to the user's eyes while the user wears the electronic device. The display may transmit at least a part of external light to the eyes. Since the electronic device displays the first frame data on the display that transmits at least a part of the external light to the eyes, the user can see the first frame data together with the external light. When the size or resolution of the first frame data corresponds to the size or resolution of the entire area of the display, the user may see external light that is shifted based on the color or transparency of the first frame data.

In operation 350, the electronic device according to various embodiments may identify second frame data from an application. The application may correspond to an application for providing content and/or UI associated with augmented reality. For example, the electronic device may generate second frame data including content associated with an external object identified based on the external light, based on the application. The location of the content inside the second frame data may correspond to a location on the display where light of the external object is penetrated through.

The size of the content and/or the UI included in the second frame data may correspond to the size of at least a part of the entire area of the display. In an embodiment, the first frame data may correspond to the background of content and/or UI provided by the application. For example, the first frame data may be associated with a background image of the UI provided to the user by the electronic device, background frame data, background color, or background object. For example, the second frame data may be associated with a foreground image provided to the user by the electronic device, foreground frame data, or foreground object.

In response to a failure to identify the second frame data (No in 350), the electronic device according to various embodiments may maintain display of the first frame data based on operation 340. In response to identifying the second frame data (Yes in 350), the electronic device according to various embodiments may change the second frame data based on the first frame data in operation 360. The electronic device according to an embodiment may adjust the color of at least one of multiple pixels included in the second frame data at least partially based on the first frame data, in response to identification of the second frame data. In an embodiment, the electronic device may change the color of at least one of multiple pixels included in the second frame data, based on the color of at least one of multiple pixels included in the first frame data.

For example, the electronic device may change the color of content included in the second frame data from the second color to a third color, based on the first color of multiple pixels included in the first frame data. For example, the third color may be a complementary color of the first color. The first color and the third color, which are complementary to each other, may be the opposite colors in a color spectrum. For example, red and green colors are complementary colors. The third color may correspond to a color determined such that, when content included in the second frame data is overlaid with the first frame data, the user can recognize the content in spite of the first color. For example, when the color of content is changed from the second color to a third color that is complementary to the first color, the content overlaid with multiple pixels of the first frame data having the first color can be recognized by the user more clearly due to the complementary contrast.

In operation 370, the electronic device according to various embodiments may display the first frame data and the second frame data on the display. The second frame data displayed on the display may correspond to the second frame data changed based on operation 360. The electronic device may control the display based on at least one of the first frame data and/or the second frame data adjusted based on operation 360. The color and transparency of each of the multiple pixels included in the display may have the color and/or transparency of the corresponding pixel included in the first frame data and/or the second frame data.

In an embodiment, the electronic device may merge multiple pixels of the first frame data and multiple pixels of the second frame data based on an alpha blending technique. The electronic device may output the merged multiple pixels on the display. In an embodiment, the electronic device may control the display such that at least one pixel included in the second frame data is displayed while being overlaid with the multiple pixels included in the first frame data. Operations of the electronic device controlling the display based on the first frame data and the second frame data will be described later with reference to FIGS. 10A to 10B.

Figure 4A:
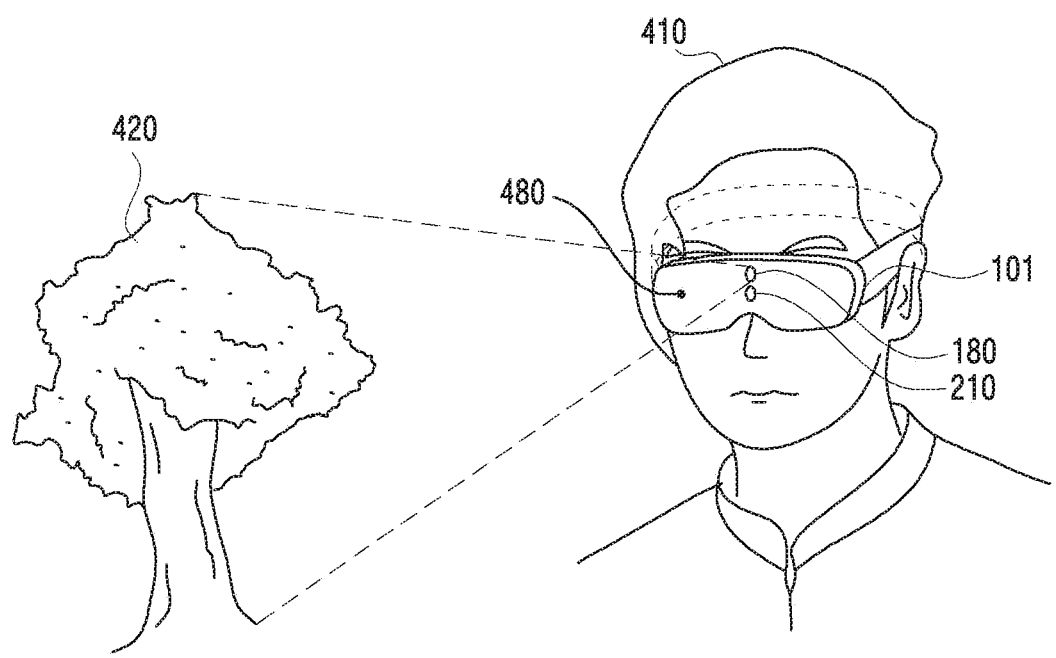
FIG. 4A is a diagram illustrating an electronic device that can be worn on a user's head in according to an embodiment of the disclosure.

FIG. 4A is a diagram illustrating an electronic device 101 that can be worn on the head of the user 410 in an embodiment of the disclosure.

Figure 4B:
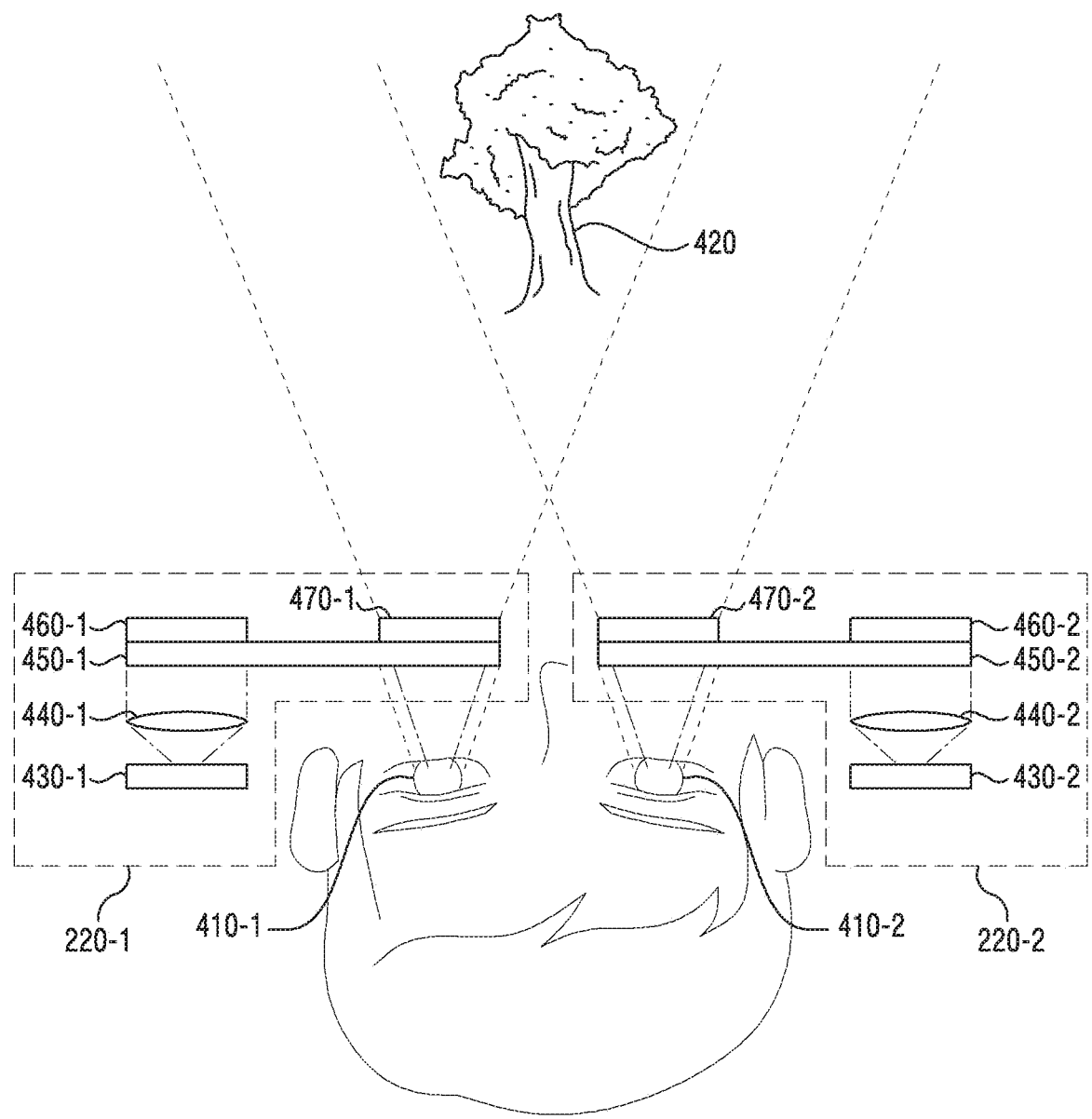
FIG. 4B is a diagram illustrating an electronic device that can be worn on a user's head in according to an embodiment of the disclosure.

FIG. 4B is a diagram illustrating an electronic device 101 that can be worn on the head of the user 410 in an embodiment of the disclosure. The electronic device 101 in FIGS. 4A to 4B may correspond to the electronic device 101 in FIGS. 1 to 2. The electronic device 101 in FIGS. 4A to 4B may correspond to a wearable device.

Referring to FIG. 4A, a situation in which the user 410 wears the electronic device 101 on his/her head is illustrated. The electronic device 101 may include one or more straps that may be fastened on the head of the user 410. For example, the user may connect multiple straps included in the electronic device 101 such that the electronic device 101 is worn on the head of the user 410.

According to various embodiments, the electronic device 101 may include a visor 480 that is disposed in front of the user's both eyes while the user 410 wears the electronic device 101 on his/her head. The type of the visor 480 may be similar to the type of at least one of sunglasses, goggles, or glasses. Inside the visor 480, at least one display included in the electronic device 101 may be disposed in front of the user's both eyes. At least one of the visor 480 and/or the display arranged in front of the user's both eyes may include a material that transmit at least a part of external light directed to the user's both eyes. At least a part of external light associated with an external object 420 may pass through the visor 480 and the display and thus reach the user's both eyes.

Referring to FIG. 4A, the camera module 180 included in the electronic device 101 may be included in one side of the electronic device 101, on which the visor is disposed, so as to acquire an image of the scenery in front of the user's both eyes. For example, when the user 410 wearing the electronic device 101 gazes at an external object 420, the electronic device 101 may acquire an image including the external object 420. The luminance sensor 210 included in the electronic device 101 may also be included in the above-mentioned one side so as to measure the luminance of external light directed to the user's both eyes. In an embodiment, the camera module 180 and/or the luminance sensor 210 of the electronic device 101 may measure images and/or luminance based on a prism and/or a reflective mirror.

According to various embodiments, the electronic device 101 may change the color and/or transparency of at least one piece of frame data displayed on the display, based on at least one of or a combination of an image acquired from the camera module 180, luminance measured by the luminance sensor 210, and information inputted from the user. In an embodiment, the transparency of first frame data which is displayed on the display, and which has a size corresponding to that of the entire area of the display, may be determined based on luminance measured by the luminance sensor 210. In an embodiment, the color of the first frame data may be determined based on information inputted from the user.

In an embodiment, the color of second frame data which is displayed so as to overlap a portion of the display 220 where the external light associated with the external object 420 is penetrated, and which includes content including information regarding the external object 420, may be determined based on the color of the first frame data. For example, the electronic device 101 may acquire second frame data including content having one or more colors based on an application for recognizing an external object 420. The electronic device 101 may change one or more colors of the content based on the color associated with the first frame data. The changed one or more colors of the content may be included in a color area that is centered on a color associated with the first frame data (for example, complementary color of the color of the first frame data).

According to various embodiments, the electronic device 101 may adjust the first frame data and/or the second frame data based on a change in external light of the user 410. For example, when the luminance measured by the luminance sensor 210 changes, the electronic device 101 may adjust the color and/or transparency of the first frame data and/or the second frame data based on the changed luminance. Various embodiments of operations performed by the electronic device 101 based on the changed luminance will be described later with reference to FIG. 16.

According to various embodiments, the electronic device 101 may control multiple pixels included in the display based on the first frame data and/or the second frame data. The number of displays included in the electronic device 101 may be one or a larger number.

Referring to FIG. 4B, the electronic device 101 may include two displays 220-1 and 220-2 corresponding to both eyes 410-1 and 410-2 of the user, respectively.

According to various embodiments, the two displays 220-1 and 220-2 may include pixel arrays 430-1 and 430-2 including multiple pixels, respectively. The pixel arrays 430-1 and 430-2 may include multiple pixels based on an LCD and/or an OLED. The electronic device 101 may control pixels included in the pixel arrays 430-1 and 430-2, respectively, based on the first frame data and/or the second frame data.

According to various embodiments, light emitted from the pixels included in each of the pixel arrays 430-1 and 430-2 may pass through lenses 440-1 and 440-2 disclosed on the front surfaces of the pixel arrays 430-1 and 430-2, respectively. After passing through each of the lenses 440-1 and 440-2, the light may pass through each of waveguide plates 450-1 and 450-2 and may reach holographic optical elements (HOE) 460-1 and 460-2. After reaching each of the holographic optic elements 460-1 and 460-2, the light may propagate along the waveguide plates 450-1 and 450-2 and may reach each of holographic optical elements 470-1 and 470-2 disposed in front of both eyes 410-1 and 410-2 of the user. After reaching each of the holographic optic elements 470-1 and 470-2, the light may be reflected toward both eyes 410-1 and 410-2 of the user together with external light passing through each of the holographic optic elements 470-1 and 470-2.

According to various embodiments, the manner of the electronic device 101 providing light which is superimposed on external light, and which is based on the first frame data and/or the second frame data, toward both eyes 410-1 and 410-2 of the user is not limited to the embodiment illustrated in FIG. 4B. In an embodiment, the electronic device 101 may output light which is superimposed on external light, and which is based on the first frame data and/or the second frame data, to the user by using a panel which is disposed in front of both eyes 410-1 and 410-2 of the user, and which includes liquid crystals. In an embodiment, the electronic device 101 may output light which is superimposed on external light, and which is based on the first frame data and/or the second frame data, to the user by simultaneously using the pixel arrays 430-1 and 430-2 and/or the panel including liquid crystals.

The electronic device 101 according to various embodiments may change the color and/or transparency of the first frame data and/or the second frame data in order to enhance the visibility of the external object 420 and/or the content that the electronic device 101 has generated by recognizing the external object 420. For example, the color and/or transparency of the first frame data and/or the second frame data may be changed based on information regarding the external environment of the electronic device 101 and/or both eyes 410-1 and 410-2 of the user. The external environment of the electronic device 101 may be associated with at least one of the intensity of external light, the luminance, the atmospheric environment, and the weather, or a combination thereof. Information regarding both eyes 410-1 and 410-2 of the user may be associated with at least one of color weakness, color blindness, eyesight, astigmatism, myopia, and hypermetropia, or a combination thereof.

For example, the electronic device 101 may change the color and/or transparency of first frame data having a size corresponding to the size of the entire area of the display, based on the passage of time from night to day or the movement of the user 410 from indoor to outdoor environment. In this case, the display of the electronic device 101 may support a function of dynamically changing the color according to the external environment, based on the first frame data. For example, by determining the color of the first frame data such that multiple colors that the user 410 with color weakness cannot distinguish are shifted, the display of the electronic device 101 may support a function similar to a corrective lens for the user 410 with color weakness.

Figure 5:
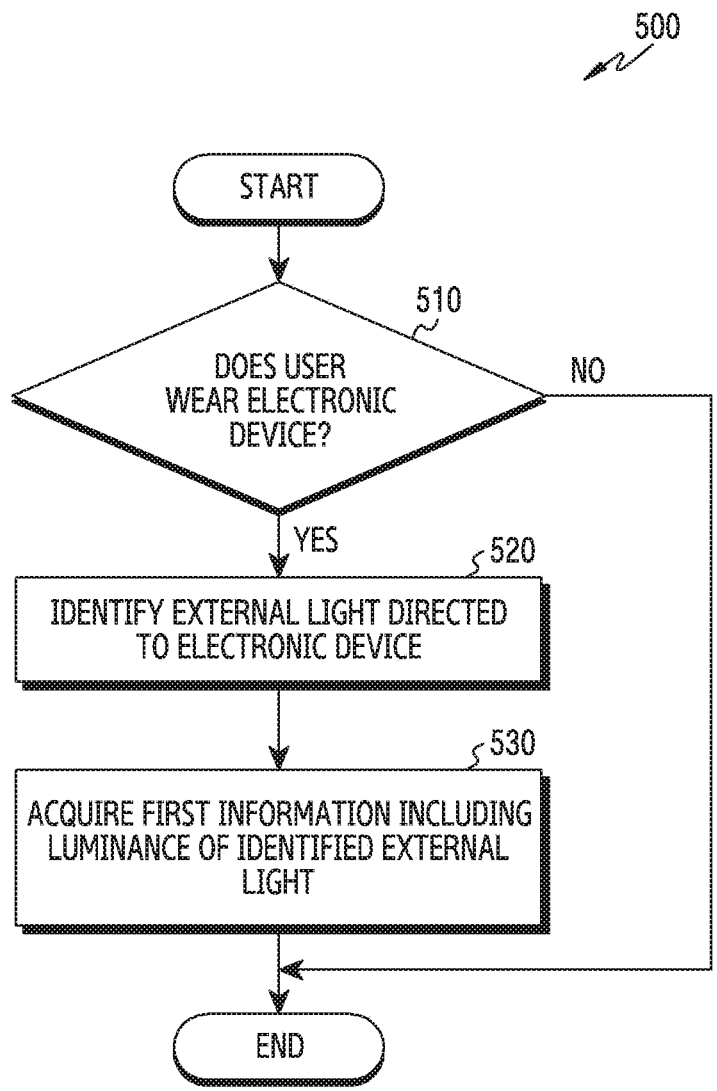
FIG. 5 is a flowchart illustrating operations of an electronic device according to an embodiment of the disclosure acquiring first information regarding first frame data based on external light.

FIG. 5 is a flowchart 500 illustrating operations of an electronic device according to an embodiment of the disclosure acquiring first information regarding first frame data based on external light. The electronic device in FIG. 5 may correspond to the electronic device 101 in FIGS. 1 to 2 and FIGS. 4A to 4B. The operations in FIG. 5 may be performed by the electronic device 101 in FIGS. 1 to 2 or by the processor 120 in FIGS. 1 to 2. At least one of the operations illustrated in FIG. 5 may be associated with operation 310 in FIG. 3.

Referring to FIG. 5, in operation 510, the electronic device according to various embodiments may determine whether or not the user wears the electronic device. For example, when the user connects multiple straps of the electronic device, the electronic device may determine, based on a switch included in at least one of the multiple straps, that the user wears the electronic device. For example, based on a proximity sensor that is viewable through one side of the electronic device, the electronic device may identify wearing of the electronic device on a user.

When the user does not wear the electronic device (No in 510), the electronic device according to various embodiments may not identify external light. In an embodiment, the electronic device may detect whether or not the user wears the electronic device for a designated time.

In response to identifying wearing of the electronic device on a user (Yes in 510), the electronic device according to various embodiments may identify external light directed to the electronic device in operation 520. In an embodiment, the electronic device may identify the external light based on the luminance sensor. In an embodiment, the electronic device may identify the external light based on an image sensor included in the camera module.

In operation 530, the electronic device according to various embodiments may acquire first information including the luminance of the identified external light. In an embodiment, the first information may include a luminance value measured by the luminance sensor included in the electronic device. The value and/or data included in the first information is not limited to the above-mentioned luminance value. For example, the first information may include image data acquired from the image sensor, temperature measured by the temperature sensor, the current time, the geographical location, or a combination thereof.

According to various embodiments, the acquired first information may be processed based on system software and/or application (for example, application for providing an augmented reality service) executed by the electronic device. For example, the acquired first information may be used to identify at least one external object included in the user's field of view. For example, the acquired first information may be used to determine the color and/or transparency of a display covering at least a part of the field of view (FOV) of the user. For example, the acquired first information may be used to acquire the first frame data in FIG. 3.

Figure 6:
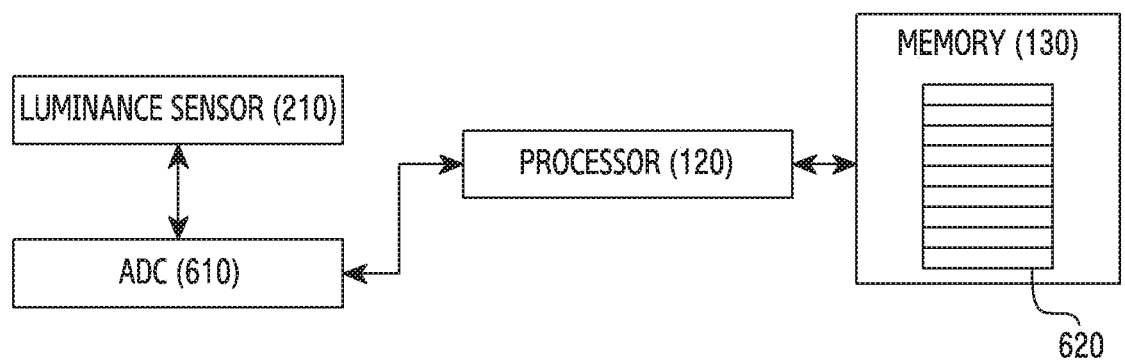
FIG. 6 is a diagram illustrating operations of an electronic device according to an embodiment of the disclosure acquiring first information by using a luminance sensor.

FIG. 6 is a diagram illustrating operations of an electronic device 101 according to an embodiment of the disclosure acquiring first information by using a luminance sensor 210. The electronic device 101 in FIG. 6 may correspond to the electronic device 101 in FIGS. 1 to 2. The electronic device 101 in FIG. 6 may acquire first information based on at least one of the operations in FIG. 5, for example, Referring to FIG. 6, the processor 120 of the electronic device 101 according to various embodiments may enable the luminance sensor 210 based on whether or not the state of the electronic device 101 satisfies a designated condition.

In an embodiment, the designated condition may be associated with whether or not the user of the electronic device 101 wears the electronic device 101. In an embodiment, the designated condition may be associated with whether the electronic device 101 is in an awake state that is distinguished from a sleep state.

In an embodiment, in response to identifying wearing of the electronic device 101 on the user, the processor 120 may enable the luminance sensor 210. The enabled luminance sensor 210 may receive external light directed to the luminance sensor 210. In response to reception of external light, the luminance sensor 210 may measure the luminance of the external light. An electric signal outputted by the luminance sensor 210 may be an analog electric signal having a voltage, a current, and/or a frequency corresponding to the measured luminance.

The electronic device 101 according to an embodiment may include an analog-digital converter (ADC) 610 connected to the luminance sensor 210 so as to change the analog electric signal outputted from the luminance sensor 210 to a digital electric signal. The ADC 610 may be disposed between the luminance sensor 210 and the processor 120. In response to the analog electric signal outputted from the luminance sensor 210, the ADC 610 may output a digital electric signal corresponding to the measured luminance. The digital electric signal outputted from the ADC 610 may be transmitted to the processor 120 of the electronic device 101.

According to various embodiments, in response to the digital electric signal outputted from the ADC 610, the processor 120 may access a 720 stored in the memory 130. The table 620 may include information indicating the relation between the luminance and the transparency. For example, the table 620 may include information regarding the mapping between each of multiple levels of luminance and one of multiple levels of transparency. The transparency may be associated with the transparency of the first frame data and/or the alpha value thereof. The table 620 may be tuned by the user of the electronic device 101 or may be changed heuristically.

According to various embodiments, the first information acquired by the electronic device 101 based on the luminance sensor 210 may include various parameters associated with the intensity of luminance of external light. For example, the first information may include at least one of an analog electric signal outputted from the luminance sensor 210, a digital electric signal outputted from the ADC 610, the transparency of first frame data acquired by accessing the table 620, and/or the alpha value thereof. The first information may include the transparency of the first frame data and/or the alpha value thereof, or may include various parameters used to acquire the transparency of the first frame data and/or the alpha value thereof.

Figure 7A:
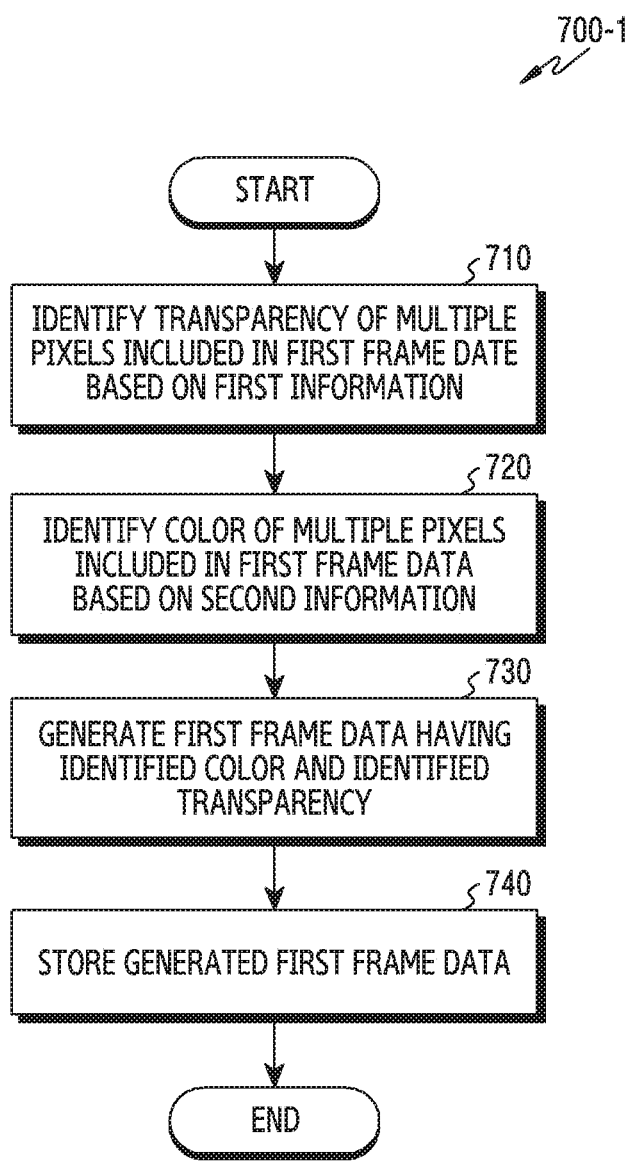
FIG. 7A is a flowchart illustrating operations of an electronic device according to an embodiment of the disclosure generating first frame data based on first information regarding the external environment and second information regarding the user.

FIG. 7A is a flowchart 700-1 illustrating operations of an electronic device according to an embodiment of the disclosure generating first frame data based on first information regarding the external environment and second information regarding the user.

Figure 7B:
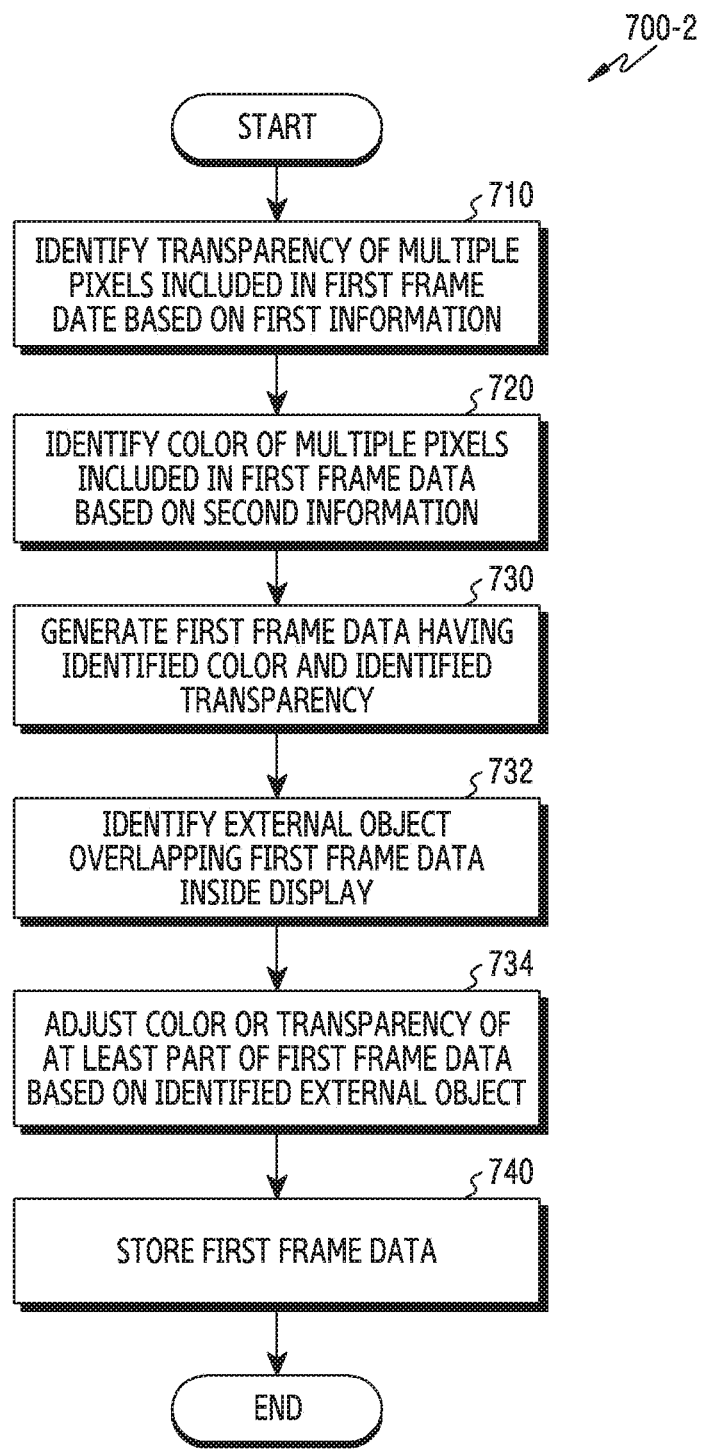
FIG. 7B is a flowchart illustrating operations of an electronic device according to an embodiment of the disclosure generating first frame data based on first information regarding the external environment and second information regarding the user.

FIG. 7B is a flowchart 700-2 illustrating operations of an electronic device according to an embodiment of the disclosure generating first frame data based on first information regarding the external environment and second information regarding the user. The electronic device in FIGS. 7A to 7B may correspond to the electronic device 101 in FIGS. 1 to 2 and FIGS. 4A to 4B. The operations in FIGS. 7A to 7B may be performed by the electronic device 101 in FIGS. 1 to 2 or by the processor 120 in FIGS. 1 to 2. At least one of the operations illustrated in FIGS. 7A to 7B may be associated with operation 330 in FIG. 3.

Referring to FIG. 7A, in operation 710, the electronic device according to various embodiments may identify the transparency of multiple pixels included in first frame data based on first information. The first information refers to information acquired based on at least one of the operations in FIG. 5, and may be associated with the external environment of the electronic device. In an embodiment, the electronic device may identify the transparency of the multiple pixels included in the first frame data, based on the luminance of external light included in the first information. The transparency of the multiple pixels may be determined, based on the table 620 in FIG. 6, as a transparency and/or an alpha value corresponding to the luminance.

In operation 720, the electronic device according to various embodiments may identify the color of the multiple pixels included in the first frame data based on second information. The second information refers to information regarding the user, and may be associated with the user's eyes, for example. In an embodiment, the color of the multiple pixels included in the first frame data may be configured such that the color of external light passing through the display is shifted based on information regarding the eyes of the user of the electronic device (for example, one or more parameters associated with at least one of color weakness and/or color blindness). Operations of the electronic device identifying the second information from the user will be described later with reference to FIG. 12.

In operation 730, the electronic device according to various embodiments may generate first frame data having an identified color and an identified transparency. Each of multiple pixels included in the first frame data may include values corresponding to red light, blue light, and green light, respectively. Each of the multiple pixels included in the first frame data may further include an alpha value indicating the transparency. Based on the identified color, the electronic device may determine the intensity of each of red light, blue light, and green light of all of the multiple pixels of the first frame data. Based on the identified transparency, the electronic device may determine the alpha value of all of the multiple pixels of the first frame data. In an embodiment, the intensity of red light, the intensity of blue light, the intensity of green light, and the alpha value, included in the multiple pixels of the first frame data, may be identical to each other.

In operation 740, the electronic device according to various embodiments may store the generated first frame data. The first frame data may be stored in a designated area (for example, first frame buffer) corresponding to the first frame data inside the memory of the electronic device. The electronic device may control the multiple pixels included in the display based on the first frame data stored in the first frame buffer. After the electronic device has controlled the multiple pixels included in the display based on the first frame data, the intensity of external light may be attenuated according to the transparency identified in operation 710 while the same passes through the display. Similarly, the color of the external light may be shifted according to the color identified in operation 720 while the same passes through the display.

In an embodiment, the electronic device may change the color and/or transparency of some of the multiple pixels included in the first frame data. Some of the multiple pixels included in the first frame data may correspond to pixels disposed on a part of the display, through which external light brighter or darker than in the case of other pixels passes.

FIG. 7B is a flowchart 700-2 illustrating operations of an electronic device according to an embodiment changing the color and/or transparency of some of multiple pixels included in first frame data. Descriptions of operations performed similarly or identically as in FIG. 7A, among the operations in FIG. 7B, will be omitted herein. For example, operations 710, 720, and 730 in FIG. 7B may be performed similarly as described with reference to FIG. 7A. The electronic device may identify first frame data including multiple pixels based on operations 710, 720, and 730, the intensity of red light, the intensity of blue light, the intensity of green light, and the alpha value of the multiple pixels being identical to each other.

Referring to FIG. 7B, in operation 732, the electronic device according to an embodiment may identify an external object overlapping the first frame data on the display. The electronic device may acquire image data regarding the external object captured by the image sensor. The external object may be included in the field of view of the user wearing the electronic device. The electronic device may identify the intensity of external light emitted from the external object.

In operation 734, the electronic device according to an embodiment may adjust the color and/or transparency of at least a part of the first frame data based on the identified external object. In response to identifying the brightness of the external object based on the image data, the electronic device may adjust the color and/or transparency of at least one pixel corresponding to the external object, among the multiple pixels included in the first frame data. The at least one pixel corresponding to the external object may be included in a part of the first frame data overlapping the external object, while the first frame data is outputted on the display.

For example, when the external object is the sun or a lightbulb, the brightness of the external object may exceed a designated threshold. Alternatively, the difference between the brightness of the external object and the brightness of the periphery of the external object may exceed a designated threshold. In response to identification of the brightness of the external object and/or the difference, which exceed corresponding thresholds, the electronic device may adjust the color and/or transparency of at least one pixel corresponding to the external object. For example, by increasing the alpha value of at least one pixel corresponding to the external object, the electronic device may block external light emitted from the external object, the brightness of which exceeds a designated threshold, from the user. For example, when the external object is a shadow or a tunnel, the brightness of the external object may be below the designated threshold. In this case, the electronic device may decrease the alpha value of at least one pixel corresponding to the external object such that the external object is not occluded by the color of the first frame data.

According to various embodiments, after adjusting the color and/or transparency of at least a part of the first frame data, the electronic device according to an embodiment may store the adjusted first frame data in operation 740. Operation 740 may be performed similarly as described with reference to FIG. 7A.

FIG. 8 is a diagram illustrating multiple pixels included in first frame data generated by an electronic device according to an embodiment of the disclosure. The electronic device in FIG. 8 may correspond to the electronic device 101 in FIGS. 1 to 2. The electronic device in FIG. 8 may acquire first frame data based on the operations in FIG. 7A or 7B.

Referring to FIG. 8, an embodiment of first frame data stored in a designated area (for example, first frame buffer 810) of the memory is illustrated. The first frame data may include multiple pixels. The multiple pixels included in the first frame data may correspond to multiple pixels included in the display of the electronic device. The width and height of the first frame data may correspond to the width and height of the display, respectively. In an embodiment, when the electronic device includes two displays corresponding to the user's both eyes (for example, pixels arrays 430-1 and 430-3 in FIG. 4B), the width and height of the first frame data may correspond to the sum of widths of the two displays and the sum of heights thereof, respectively.

The (N+1)×(M+1) pixels included in the first frame data are illustrated. The first frame data may correspond to a display including (N+1) pixels horizontally and (M+1) pixels vertically. In FIG. 8, the intensify of red light of the pixel disposed at coordinate (a, b) inside the first frame data may be referred to as Rab, the intensity of green light thereof may be referred to as Gab, the intensity of blue light thereof may be referred to as Bab, and the transparency and/or alpha value thereof may be referred to as Aab.

According to various embodiments, the transparency and/or alpha value of the first frame data may be determined based on the intensity and/or luminance of external light passing through the display. According to various embodiments, the electronic device may acquire the transparency and/or alpha value of the first frame data according to first information regarding the external environment of the electronic device based on operation 310 in FIG. 3, the operations in FIG. 5, or operation 710 in FIG. 7. The electronic device may input the acquired transparency and/or alpha value to the transparency and/or alpha value of the (N+1)×(M+1) pixels in FIG. 8.

According to various embodiments, the color of the first frame data (for example, combination of the intensity of red light of the multiple pixels, the intensity of green light thereof, and the intensity of blue light thereof) may be determined based on second information regarding the user wearing the electronic device. The second information refers to information pre-inputted by the user, and may include a color preferred by the user and multiple colors mapped to multiple situations, respectively, by the user. The second information may include a color designated to correct at least one of the user's color blindness and/or color weakness. According to various embodiments, the electronic device may acquire the color of the first frame data according to the second information based on operation 320 in FIG. 3 or operation 720 in FIG. 7. The electronic device may input the intensity of red light, the intensity of green light, and the intensity of blue light, corresponding to the acquired color, to the intensity of red light, the intensity of green light, and the intensity of blue light of the (N+1)×(M+1) pixels in FIG. 8, respectively.

According to various embodiments, the intensity of red light, the intensity of green light, the intensity of blue light, and the alpha value, included in the multiple pixels of the first frame data, may be variously adjusted based on the first information and/or the second information. In an embodiment, the color and/or transparency of the multiple pixels may be determined based on data measured by a luminance sensor, an ultraviolet sensor and/or an infrared sensor. In an embodiment, each of the color and/or transparency of the multiple pixels may have a uniform value in the entire area of the first frame data. In an embodiment, the color of the multiple pixels may be gradually changed along a designated direction inside the first frame data based on a gradation effect.

According to various embodiments, when the external light directed to the electronic device changes, the electronic device may change the color and/or transparency of the multiple pixels included in the first frame data based on the luminance and/or color of the changed external light. For example, when the user moves while wearing the electronic device, the electronic device may identify a change in the luminance resulting from a change in the external light, based on the luminance sensor. In response to identifying a change in the luminance, the electronic device may change the transparency of the multiple pixels included in the first frame data.

For example, when the user moves from a bright place to a darker plate, the electronic device may identify a decrease in the luminance. In response to identifying the decrease in the luminance, the electronic device may increase the transparency of multiple pixels included in the first frame data, or may decrease the alpha value. For example, when the user moves from a dark plate to a brighter place, the electronic device may decrease the transparency or increase the alpha value. When the external light is changed, the electronic device may change the transparency of the multiple pixels included in the first frame data. For example, the electronic device may change/maintain the transparency of the multiple pixels included in the first frame data such that, even if the luminance of the external light changes, the luminance of external light reaching the user falls within a designated range.

According to various embodiments, the multiple pixels included in the first frame data may be at least partially merged with different frame data identified from an application of the electronic device and then outputted on the display. The different frame data may include second frame data identified in operation 350 in FIG. 3. The electronic device may change the color and/or transparency of the different frame data based on the color and/or transparency of at least one of the multiple pixels of the first frame data.

Figure 9:
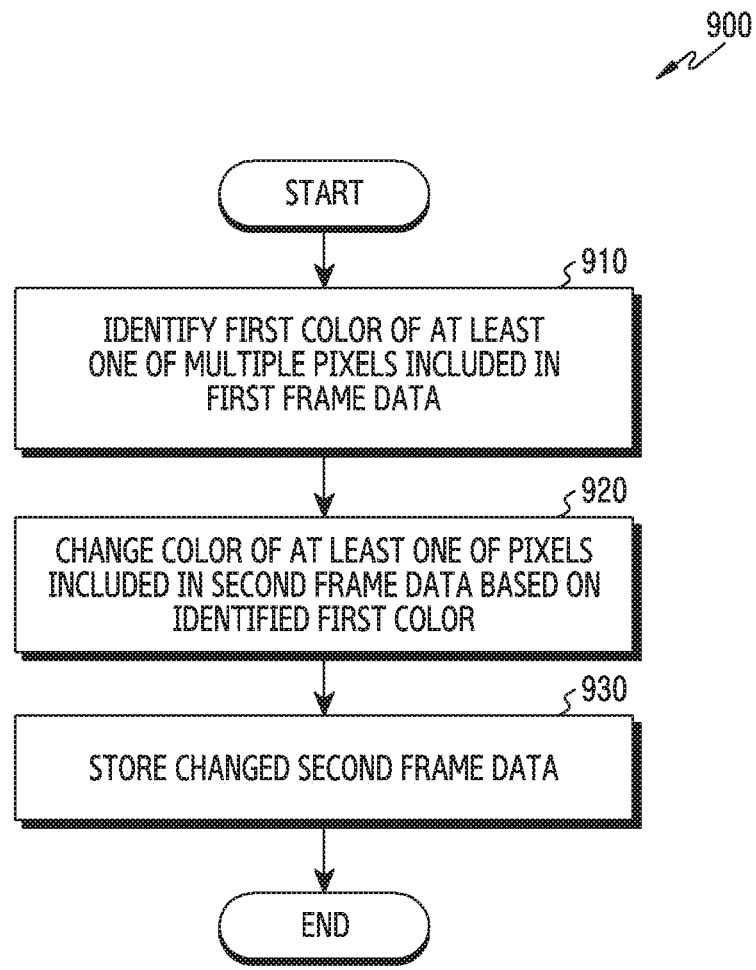
FIG. 9 is a flowchart illustrating operations of an electronic device according to an embodiment of the disclosure adjusting second frame data based on first frame data.

FIG. 9 is a flowchart 900 illustrating operations of an electronic device according to an embodiment of the disclosure adjusting second frame data based on first frame data. The electronic device in FIG. 9 may correspond to the electronic device 101 in FIGS. 1 to 2 and FIGS. 4A to 4B. The operations in FIG. 9 may be performed by the electronic device 101 in FIGS. 1 to 2 or by the processor 120 in FIGS. 1 to 2. At least one of the operations illustrated in FIG. 9 may be associated with operation 360 in FIG. 3.

Referring to FIG. 9, in operation 910, the electronic device according to various embodiments may identify the first color of at least one of multiple pixels included in first frame data. The first frame data may be acquired based on operation 330 in FIG. 3 or at least one of the operations described with reference to FIGS. 7A to 7B. In an embodiment, the electronic device may identify the first color from first frame data stored in a designated area of the memory as in FIG. 8 (for example, first frame buffer 810 in FIG. 8). The first color may be indicated as data including the intensity of red light, the intensity of green light, and the intensity of blue light, inputted to at least one of the multiple pixels included in the first frame data.

In operation 920, the electronic device according to various embodiments may change the color of at least one of the pixels included in the second frame data based on the identified first color. Content acquired from an application currently executed by the electronic device (for example, content for providing an augmented reality service associated with an external object) may be included in a part of the second frame data. When the content is included in a part of the second frame data, the electronic device may adjust the color of pixels included in the part, among the pixels included in the second frame data. Based on the first color of at least one of the multiple pixels included in the first frame data, the electronic device according to an embodiment may change the second color of at least one of the multiple pixels included in the second frame data to a third color corresponding to the complementary color of the first color.

In operation 930, the electronic device according to various embodiments may store the changed second frame data. The second frame data may be stored in a designated area (for example, second frame buffer) corresponding to the second frame data inside the memory of the electronic device. The electronic device may control the multiple pixels included in the display based on the second frame data stored in the second frame buffer.

In an embodiment, the electronic device may control the display by simultaneously using the second frame data and the first frame data, based on operation 370 in FIG. 3. The electronic device may adjust the color and/or transparency of the entire area of the display based on the first frame data and then may display content included in the second frame data. Since the color of the entire area of the display adjusted based on the first frame data and the color of the content displayed based on the second frame data are complementary to each other, the user of the electronic device may clearly recognize the content. Hereinafter, operations of an electronic device according to an embodiment controlling the display by simultaneously using second frame data and first frame data will be described.

Figure 10A:
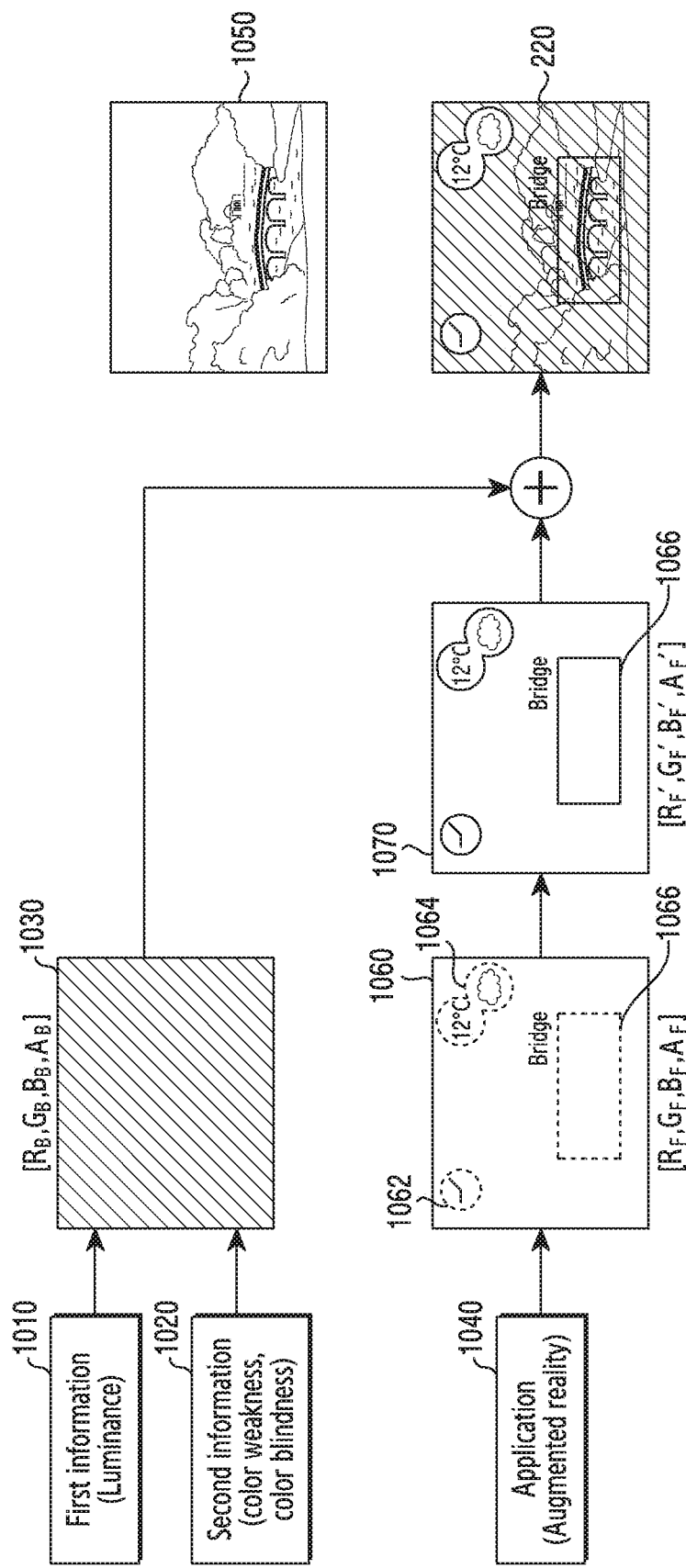
FIG. 10A is a diagram illustrating operations of an electronic device according to an embodiment of the disclosure controlling a display based on first frame data and second frame data.

FIG. 10A is a diagram illustrating operations of an electronic device according to an embodiment of the disclosure controlling a display 220 based on first frame data 1030 and second frame data 1060.

Figure 10B:
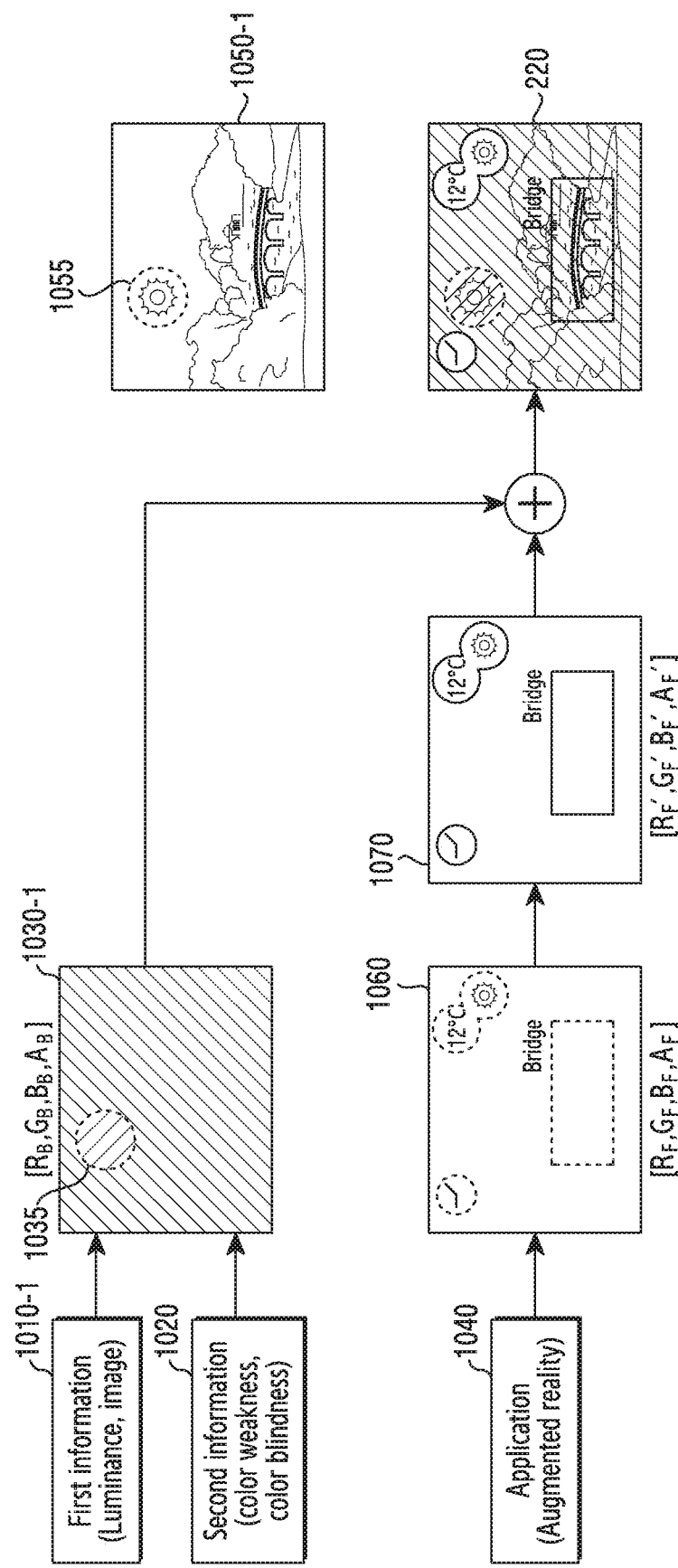
FIG. 10B is a diagram illustrating operations of an electronic device according to an embodiment of the disclosure controlling a display based on first frame data and second frame data.

FIG. 10B is a diagram illustrating operations of an electronic device according to an embodiment of the disclosure controlling a display 220 based on first frame data 1030 and second frame data 1060. The electronic device in FIGS. 10A to 10B may correspond to the electronic device 101 in FIGS. 1 to 2 and FIGS. 4A to 4B.

Referring to FIG. 10A, an example of an image 1050 included in the FOV of a user wearing an electronic device according to various embodiments on his/her head is illustrated. Since the electronic device includes a display 220 disposed in front or the user's both eyes, the user can see the image 1050 by using external light passing through the display 220.

According to various embodiments, the electronic device may generate first frame data 1030 based on first information 1010 and second information 1020. The first information 1010 may include data associated with the external environment of the electronic device (for example, image 1050 included in the FOV of the user), for example, data regarding the luminance of external light directed to the electronic device. The electronic device may identify or acquire first information 1010 based on operation 310 in FIG. 3 or the operations in FIG. 5. The second information 1020 refers to information regarding the user of the electronic device, and may include, for example, data indicating the color preferred by the user, data regarding both eyes of the user (data regarding at least one of color weakness and/or color blindness), or a combination thereof. The electronic device may identify or acquire the second information 1020 based on operation 320 in FIG. 3.

The first frame data 1030 in FIG. 10A may be identified or acquired based on operation 330 in FIG. 3 or the operations in FIG. 7A. The first frame data 1030 may have uniform color and transparency in the entire area of the display 220 of the electronic device. For example, data of all pixels included in the first frame data 1030 may be identical to each other as [RB, GB, BB, AB].

According to various embodiments, the color [RB, GB, BB] of all pixels included in the first frame data 1030 may be determined based on second information 1020. In an embodiment, the color of multiple pixels included in the first frame data may correspond to a color for shifting a color of external light penetrating the display 220, based on one or more parameters associated with at least one of the user's color weakness and/or color blindness. The transparency and/or alpha value (AB) of all pixels included in the first frame data 1030 may be determined based on the first information 1010. For example, the electronic device may determine the alpha value (AB) corresponding to luminance measured by the luminance sensor, based on the table 620 in FIG. 6, for example.

According to various embodiments, the electronic device may acquire second frame data 1060 based on an application 1040 currently executed by the electronic device. The application 1040 may include instructions for providing an augmented reality service associated with an external object that the user is interested in. The electronic device may identify an external object (for example, a bridge) included in the image 1050, based on the application 1040. The electronic device may acquire at least one content to be provided to the user, based on the application 1040. The content may include not only information regarding the identified external object, but also information regarding the user's external environment (for example, information regarding the current time, the current weather, the current temperature, and the current location).

According to various embodiments, the second frame data 1060 may include a visual element corresponding to content acquired based on the application 1040. The visual element is generated by the electronic device such that the content is visually expressed based on a text, an image, a video, a figure, or a combination thereof. According to various embodiments, the second frame data 1060 may include multiple visual elements 1062, 1064, and 1066 corresponding to multiple contents associated with the augmented reality service, respectively. For example, the visual element 1062 may visually express the current time based on a digital watch and/or an analog watch type, as information regarding the user's external environment. For example, the visual element 1064 may visually express the current temperature and/or the current weather based on a gauge type, as information regarding the user's external environment. For example, the visual element 1066 may visually express the result of identifying an external object based on a text, an image, a figure, or a combination thereof. The color and/or transparency of the second frame data 1060 may be independent of the color and/or transparency of the first frame data 1030.

According to various embodiments, when the electronic device merges first frame data 1030 and second frame data 1060, which have been identified independently, and then outputs the same inside the display 220, the visibility of multiple visual elements 1062, 1064, and 1066 included in the second frame data 1060 may be degraded by the color of the first frame data 1030. In order to prevent degradation of the visibility, the electronic device may change the color and/or transparency of the second frame data 1060 identified independently of the first frame data 1030, based on the color and/or transparency of the first frame data 1030.

In an embodiment, the electronic device may change the color and/or transparency of the second frame data 1060 based on operation 360 in FIG. 3 or the operations in FIG. 9. For example, the color of multiple pixels included in multiple visual elements 1062, 1064, and 1066 may be changed to the complementary color of the color used to generate the first frame data 1060. For example, when the color of the first frame data 1030 is a bright color, the electronic device may change the color of multiple pixels included in the second frame data 1060 (for example, multiple pixels included in the multiple visual elements 1062, 2064, and 1066) to a dark color. For example, when the color of the first frame data 1030 is a dark color, the electronic device may change the color of multiple pixels included in the second frame data 1060 (for example, multiple pixels included in the multiple visual elements 1062, 2064, and 1066) to a bright color.

In an embodiment, the electronic device may adjust the color of multiple pixels included in the second frame data 1060 by applying a gamma curve to each of the intensity of red light, the intensity of green light, and the intensity of blue light, included in the multiple pixels of the second frame data 1060. The gamma curve may be determined based on the color of the multiple pixels of the first frame data 1030. For example, when the color of multiple pixels of the first frame data 1030 is [RB, GB, BB]=[256, 0, 0], the electronic device may adjust the gamma curve corresponding to the red light in order to enhance the visibility of the visual element having red color among the multiple visual elements 1062, 1064, and 1066. By applying the adjusted gamma curve to the second frame data 1060, the electronic device may change the color of the visual element having red color among the multiple visual elements 1062, 1064, and 1066.

According to various embodiments, second frame data 1070 that the electronic device has acquired by adjusting the color of the second frame data 1060 based on the color and/or transparency of the first frame data 1030 is illustrated. The electronic device may control multiple pixels included in the display 220 such that an image corresponding to the second frame data 1070 having the changed color is overlaid with an image corresponding to the first frame data 1030 inside the display 220. Control of the display 220 may be performed based on an alpha blending technique and/or a display controller.

According to various embodiments, the result of controlling the display 220, based on the first frame data 1030 and the second frame data 1070, by the electronic device is illustrated. External light passing through the display 220 may be shifted by the color of the first frame data 1030. External light passing through the display 220 may be attenuated according to the transparency and/or alpha value of the first frame data 1030. Multiple visual elements 1062, 1064, and 1066 generated by recognizing an image 1050 which is displayed inside the display 220, and which is included in the user's FOV, may have a different color that is complementary to the color of the first frame data 1030.

In an embodiment, the electronic device may change the color and/or transparency of a part of the first frame data 1030, based on a relatively bright part and/or a dark part inside the user's FOV.

Referring to FIG. 10B, another example of an image 1050-1 included in the user's FOV is illustrated. A relatively bright external object 1055 (for example, the sun) may be included in the user's FOV. The electronic device may identify a relatively bright part and/or a dark part inside the user's FOV, based on luminance and/or image data included in the first information 1010-1.

According to various embodiments, in response to identifying a relatively bright part and/or a dark part inside the user's FOV, the electronic device may change the color and/or transparency of a part 1035 of the first frame data 1030-1 based on operation 330 in FIG. 3 or the operations in FIG. 7B. The part 1035 may correspond to a part penetrated by external light corresponding to an external object 1055 identified inside the display 220. For example, in response to identifying a relatively bright external object 1055, the electronic device may change the transparency of the part 1035 of the first frame data 1030-1 to a value smaller than that of the other parts. Since the electronic device controls the display 220 based on the first frame data 1030-1 and the second frame data 1070, the user's FOV can be preserved in spite of the existence of a relatively bright external object 1055.

Figure 11:
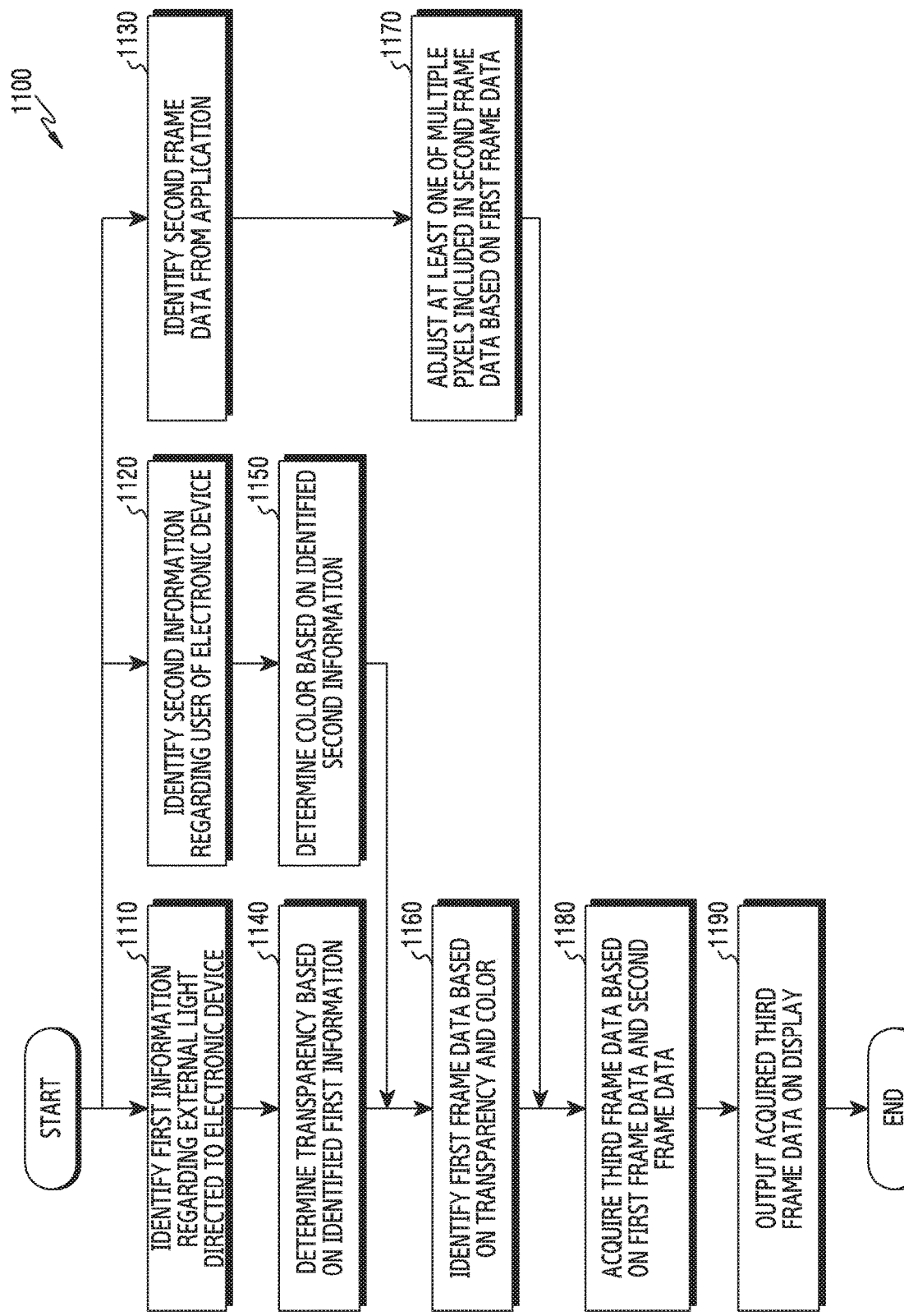
FIG. 11 is a flowchart illustrating an order according to which an electronic device according to an embodiment of the disclosure generates first frame data and second frame data.

FIG. 11 is a flowchart 1100 illustrating an order according to which an electronic device according to an embodiment of the disclosure generates first frame data and second frame data. The electronic device in FIG. 11 may correspond to the electronic device 101 in FIGS. 1 to 2. The operations in FIG. 11 may be performed by the electronic device 101 in FIGS. 1 to 2 or by the processor 120 in FIGS. 1 to 2. In various embodiments, the electronic device may acquire first frame data and second frame data based on multiple processes or threads distinguished from each other, respectively. At least some of the operations in FIG. 11 may be performed similarly to the operations in FIG. 3.

Referring to FIG. 11, in operation 1110, the electronic device according to various embodiments may identify first information regarding external light directed to the electronic device. The electronic device may perform operation 1110 similarly to operation 310 in FIG. 3. In response to identification of the first information, the electronic device according to various embodiments may determine the transparency based on the identified first information in operation 1140.

In operation 1120, the electronic device according to various embodiments may identify second information regarding the user of the electronic device. The electronic device may perform operation 1120 similarly to operation 320 in FIG. 3. In response to identification of the second information, the electronic device according to various embodiments may determine the color based on the identified second information in operation 1150.

In operation 1130, the electronic device according to various embodiments may identify second frame data from an application. The electronic device may perform operation 1130 similarly to operation 350 in FIG. 3. When the electronic device simultaneously executes multiple applications, the electronic device may identify multiple pieces of second frame data from the multiple applications that are currently executed.

According to various embodiments, the electronic device may perform operations 1110, 1120 and 1130 independently of each other. For example, the timepoints at which operations 1110, 1120, and 1130 are performed may be identical. The electronic device may independently perform at least one of operations 1110, 1120, and 1130 based on multiple processes or threads distinguished from each other.

According to various embodiments, after determining the transparency and the color based on the first information and the second information, respectively, the electronic device may identify first frame data based on the transparency and the color in operation 1160. In an embodiment, the electronic device may identify first frame data based on the operation in FIG. 7A or 7B.

According to various embodiments, in response to identification of the first frame data, the electronic device may adjust at least one of multiple pixels included in the second frame data, based on the first frame data, in operation 1170. In an embodiment, the electronic device may adjust at least one of multiple pixels included in the second frame data based on the operation in FIG. 9. In an embodiment, when the electronic device has identified multiple pieces of second frame data from multiple applications currently executed, the electronic device may perform operation 1170 with regard to each of the multiple pieces of identified second frame data.

According to various embodiments, the electronic device may acquire third frame data based on the first frame data and the second frame data in operation 1180 after operations 1160 and 1170. For example, the electronic device may acquire third frame data by merging the first frame data and the second frame data based on alpha blending and/or overlay. In an embodiment, when the electronic device has identified multiple pieces of second frame data from multiple applications currently executed, the electronic device may merge the first frame data and the multiple pieces of second frame data based on alpha blending and/or overlay.

According to various embodiments, in response to acquisition of the third frame data, the electronic device according to various embodiments may output the acquired third frame data on the display in operation 1190. The display of the electronic device may transmit external light directed to the first surface thereof to the second surface thereof, which is opposite to the first surface, and which faces the user's both eyes. Multiple pixels included in the display may output light to the second surface. As the electronic device controls the multiple pixels included in the display based on the third frame data, the user can simultaneously receive external light passing from the first surface to the second surface and light corresponding to the multiple pixels included in the third frame data.

Figure 12:
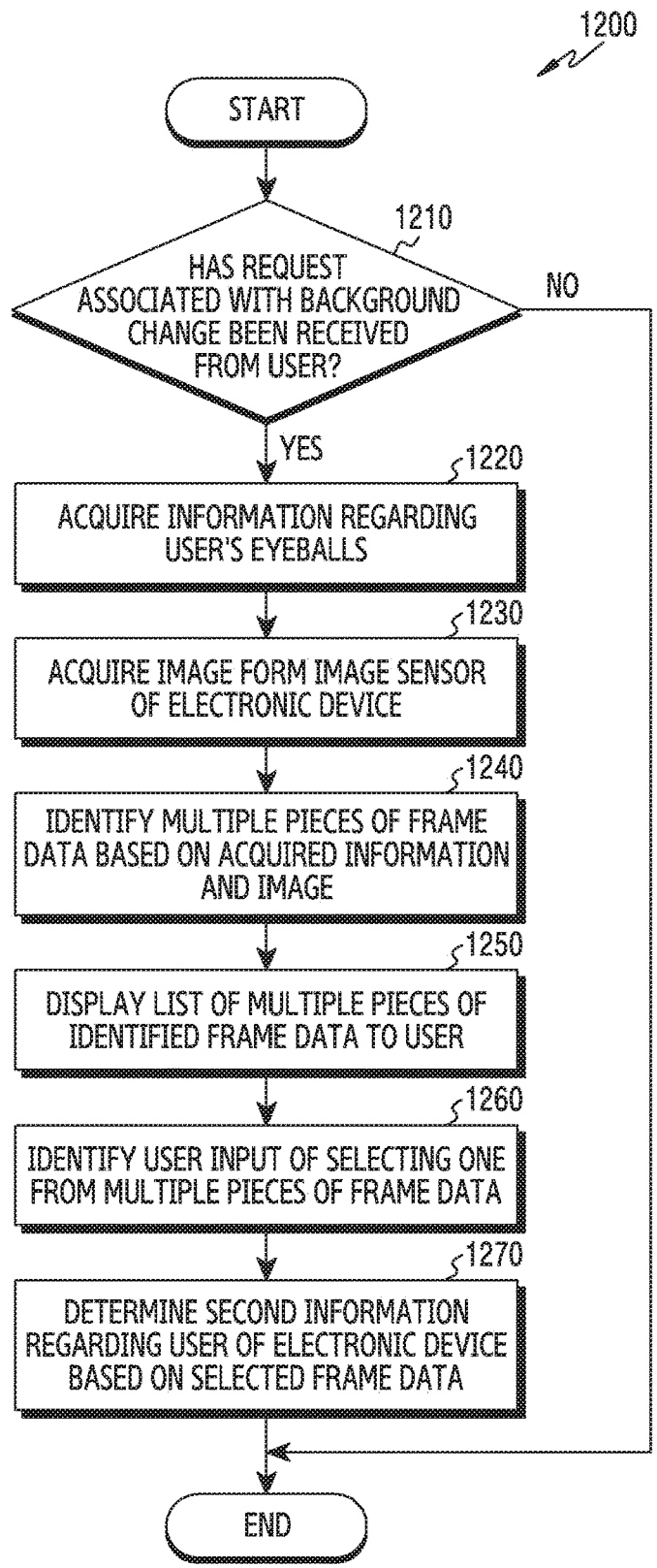
FIG. 12 is a flowchart illustrating operations of an electronic device according to an embodiment of the disclosure identifying second information regarding first frame data based on information inputted from the user.

FIG. 12 is a flowchart 1200 illustrating operations of an electronic device according to an embodiment of the disclosure identifying second information regarding first frame data based on information inputted from the user. The electronic device in FIG. 12 may correspond to the electronic device 101 in FIGS. 1 to 2. The operations in FIG. 12 may be performed by the electronic device 101 in FIGS. 1 to 2 or by the processor 120 in FIGS. 1 to 2. At least some of the operations in FIG. 12 may be associated with operation 320 in FIG. 3.

Referring to FIG. 12, in operation 1210, the electronic device according to various embodiments may determine whether or not a request associated with a change of the background has been received from the user. In an embodiment in which the electronic device corresponds to a wearable device, the user wearing the electronic device may perform a designated gesture or input a voice command, thereby inputting a command to change the background to the electronic device. The designated gesture may include at least one of or a combination of a gesture of touching a designated part of the housing of the electronic device (for example, a part to which a touch panel has been applied), a gesture of tapping the electronic device, a gesture of pressing or clicking a designated button of the electronic device, and a gesture performed inside the FOV of the image sensor of the electronic device. The command to change the background may correspond to a command to change the color and/or transparency of the display. The command to change the background may correspond to a command to change the color and/or transparency of the first frame data.

When the request has not been received (No in 1210), the electronic device according to various embodiments may not acquire information regarding both eyes of the user of the electronic device.

In response to reception of the request (Yes in 1210), the electronic device according to various embodiments may acquire information regarding the user's eyes in operation 1220. The electronic device may acquire information personalized for the user, including information regarding the eyes, from the user. For example, the electronic device may acquire information such as the user's gender and age. For example, the electronic device may acquire at least one of the eyesight of each of the user's both eyes, whether or not the user has astigmatism, and whether or not the user has myopia. For example, the electronic device may acquire information regarding at least one of the user's color weakness and/or color blindness. The electronic device may display a UI for acquiring the information to the user on the display.

In response to reception of the request, the electronic device according to various embodiments may acquire an image from the image sensor included in the electronic device in operation 1230. In an embodiment in which the electronic device corresponds to a wearable device, the acquired image may include external light directed to the user's both eyes or passing through the display. Operations 1220 and 1230 may be performed independently, and may not be limited to the order illustrated in FIG. 12.

In operation 1240, the electronic device according to various embodiments may identify multiple pieces of frame data based on the acquired information and image. The multiple pieces of frame data may correspond to candidate frame data with regard to first frame data (for example, first frame data 1030 in FIG. 10A). The electronic device may identify multiple pieces of frame data based on machine learning. The electronic device may identify multiple pieces of frame data based on a neural network executed inside the processor or an external electronic device (for example, external electronic device 230 in FIG. 2) connected to the electronic device. Various embodiments of operations of the electronic device identifying multiple pieces of frame data based on an external electronic device will be described later with reference to FIG. 14.

In response to identification of multiple pieces of frame data, the electronic device according to various embodiments may display a list of multiple pieces of identified frame data to the user in operation 1250. The list of multiple pieces of frame data may be visually provided to the user through the display of the electronic device. The user may select one from the displayed list of multiple pieces of frame data.

In operation 1260, the electronic device according to various embodiments may identify a user input of selecting one from the multiple pieces of frame data. Operations of the electronic device displaying the list of multiple pieces of frame data based on operations 1250 and 1260 and identifying a user input will be described later with reference to FIGS. 13A to 13D.

In response to identification of a user input, the electronic device according to various embodiments may determine second information regarding the user of the electronic device, based on the selected frame data, in operation 1270.

For example, the second information may include information regarding the color of the selected frame data. The second information may include information regarding the user's eyes, acquired in operation 1220. The second information may include information regarding the color of a different piece of frame data, which is distinguished from the frame data selected from the list of multiple pieces of frame data.

According to various embodiments, the determined second information may be stored in the memory and used to determine the color of the first frame data. In an embodiment in which the electronic device identifies multiple pieces of frame data in operation 1240 based on machine learning, the determined second information may be used by the electronic device to learn which frame data is selected by the user. In an embodiment in which the electronic device identifies multiple pieces of frame data in operation 1240 based on an external electronic device, the determined second information may be transmitted to the external electronic device. After receiving the second information, the external electronic device may learn which frame data is selected by the user of the electronic device.

Figure 13A:
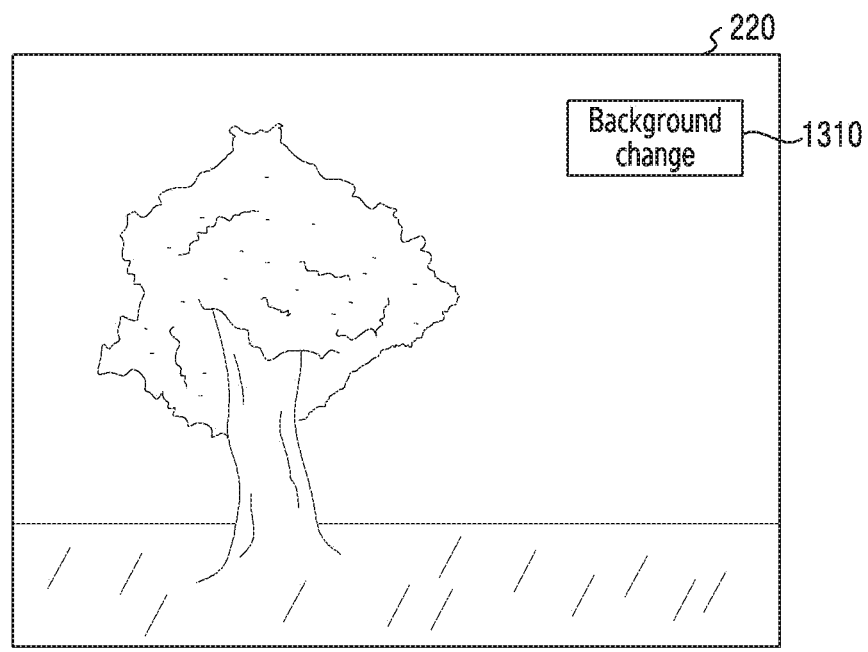
FIG. 13A is a diagram illustrating an example of a user interface (UI) that an electronic device according to an embodiment of the disclosure provides to the user in order to identify the second information in FIG. 12.

FIG. 13A is a diagram illustrating an example of a UI that an electronic device according to an embodiment of the disclosure provides to the user in order to identify the second information in FIG. 12.

Figure 13B:
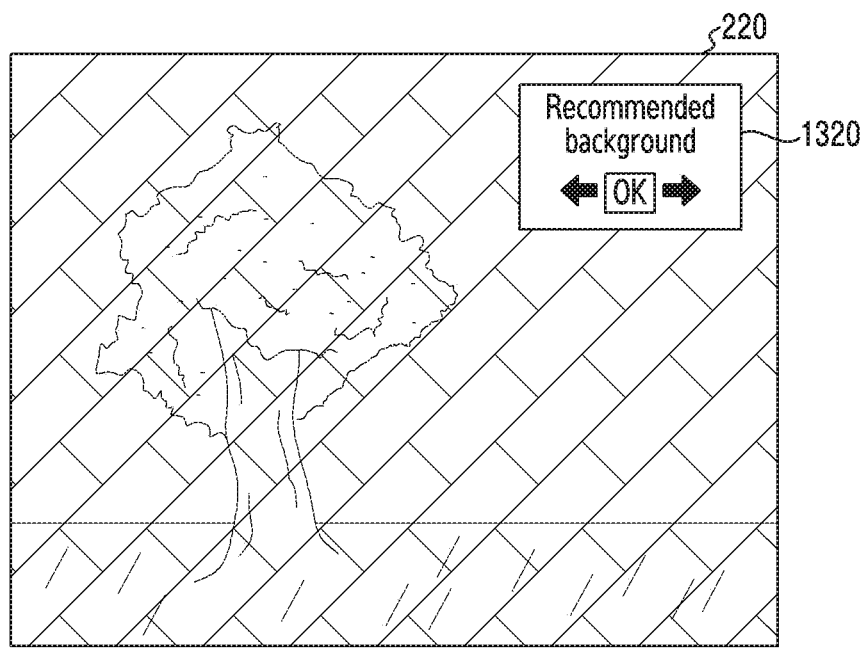
FIG. 13B is a diagram illustrating an example of a UI that an electronic device according to an embodiment of the disclosure provides to the user in order to identify the second information in FIG. 12.

FIG. 13B is a diagram illustrating an example of a UI that an electronic device according to an embodiment of the disclosure provides to the user in order to identify the second information in FIG. 12.

Figure 13C:
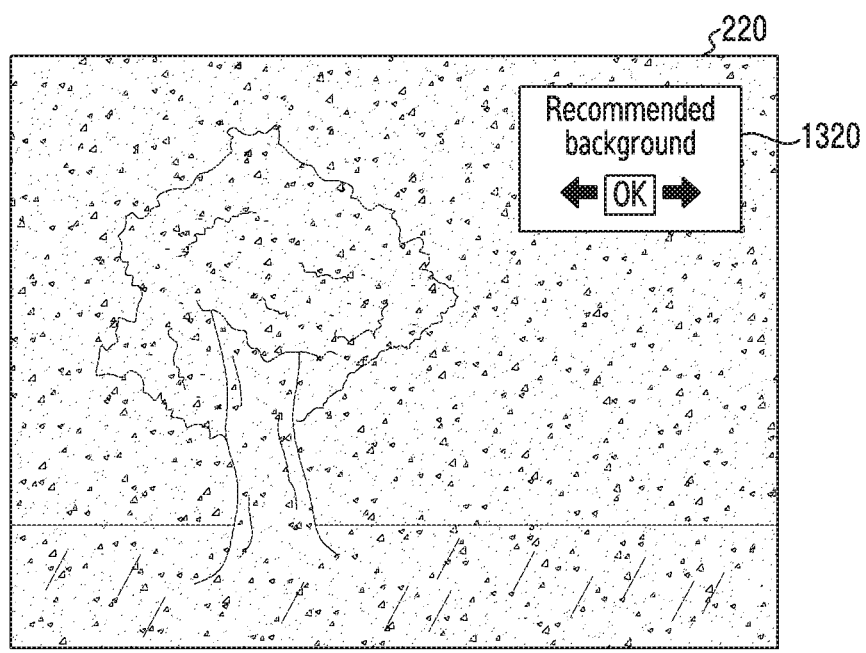
FIG. 13C is a diagram illustrating an example of a UI that an electronic device according to an embodiment of the disclosure provides to the user in order to identify the second information in FIG. 12.

FIG. 13C is a diagram illustrating an example of a UI that an electronic device according to an embodiment of the disclosure provides to the user in order to identify the second information in FIG. 12.

Figure 13D:
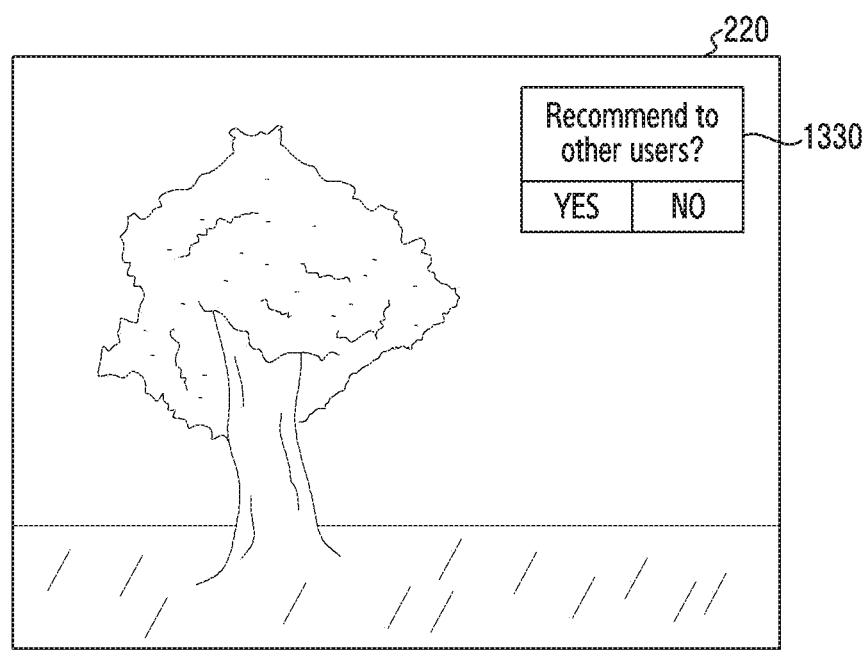
FIG. 13D is a diagram illustrating an example of a UI that an electronic device according to an embodiment of the disclosure provides to the user in order to identify the second information in FIG. 12.

FIG. 13D is a diagram illustrating an example of a UI that an electronic device according to an embodiment of the disclosure provides to the user in order to identify the second information in FIG. 12. The electronic device in FIGS. 13A to 13D may correspond to the electronic device 101 in FIGS. 1 to 2 and FIGS. 4A to 4B. The UIs illustrated in FIGS. 13A to 13D may be associated with operations 1250 and 1260 in FIG. 12.

Referring to FIG. 13A, an example of an image inside a display 220 disposed toward the user's both eyes, while the user wears the electronic device on his/her head, according to various embodiments is illustrated. The image inside the display 220 may be a combination of external light passing through the display and light emitted from multiple pixels of the display. The electronic device may display a visual element 1310 (for example, "Background change" menu) for changing the background of the display 220 and/or the first frame data, inside the display 220. The user may select the visual element 1310 based on a designated gesture and/or voice command.

According to various embodiments, in response to selection of the visual element 1310 by the user, the electronic device may provide a list of multiple pieces of frame data to the user. The multiple pieces of frame data may be associated with the background of the display 220. The multiple pieces of frame data may have colors and/or transparencies distinguished from each other, respectively. In an embodiment, the multiple pieces of frame data may have different patterns. Prior to providing the list of multiple pieces of frame data, the electronic device may acquire information personalized for the user, including information regarding eyes, from the user based on operation 1220, for example. The electronic device may acquire image data necessary to identify multiple pieces of frame data based on operation 1230, for example. The electronic device may identify multiple pieces of frame data associated with the acquired information based on operation 1240, for example.

Referring to FIGS. 13B to 13C, an example of a UI displayed by an electronic device according to various embodiments to provide a list of multiple pieces of frame data is illustrated. The electronic device may display one of multiple pieces of frame data inside the display 220, together with a visual element 1320 for successively exploring the multiple pieces of frame data. The user may successively explore the multiple pieces of frame data by controlling the visual element 1320 based on a gesture and/or a voice command (for example, by touching or clicking the arrow included in the visual element 1320). While the user successively explores the multiple pieces of frame data, the electronic device may change the color and/or transparency of the display 220 based on one of the multiple pieces of frame data. The user may select a piece of frame data having preferred color and/or transparency from the multiple pieces of frame data by controlling the visual element 1320 (for example, by inputting a gesture and/or a voice input associated with "OK" button).

Referring to FIG. 13D, according to various embodiments, in response to identifying frame data selected by the user, the electronic device may display a UI associated with the selected frame data on the display. The color and/or transparency of the display may be associated with the color and/or transparency of the selected frame data. In an embodiment, the selected frame data may be determined as the first frame data 1030 in FIG. 10A, or may be stored in the first frame buffer 810 in FIG. 8. In an embodiment, the UI outputted together with the selected frame data may include a visual element 1330 for recommending the selected frame data to other users (for example, a menu including the text "Would you recommend the background to other users?"). When the user inputs a gesture and/or a voice command for selecting the visual element 1330, the electronic device may transmit information regarding the selected frame data to an external electronic device.

Figure 14:
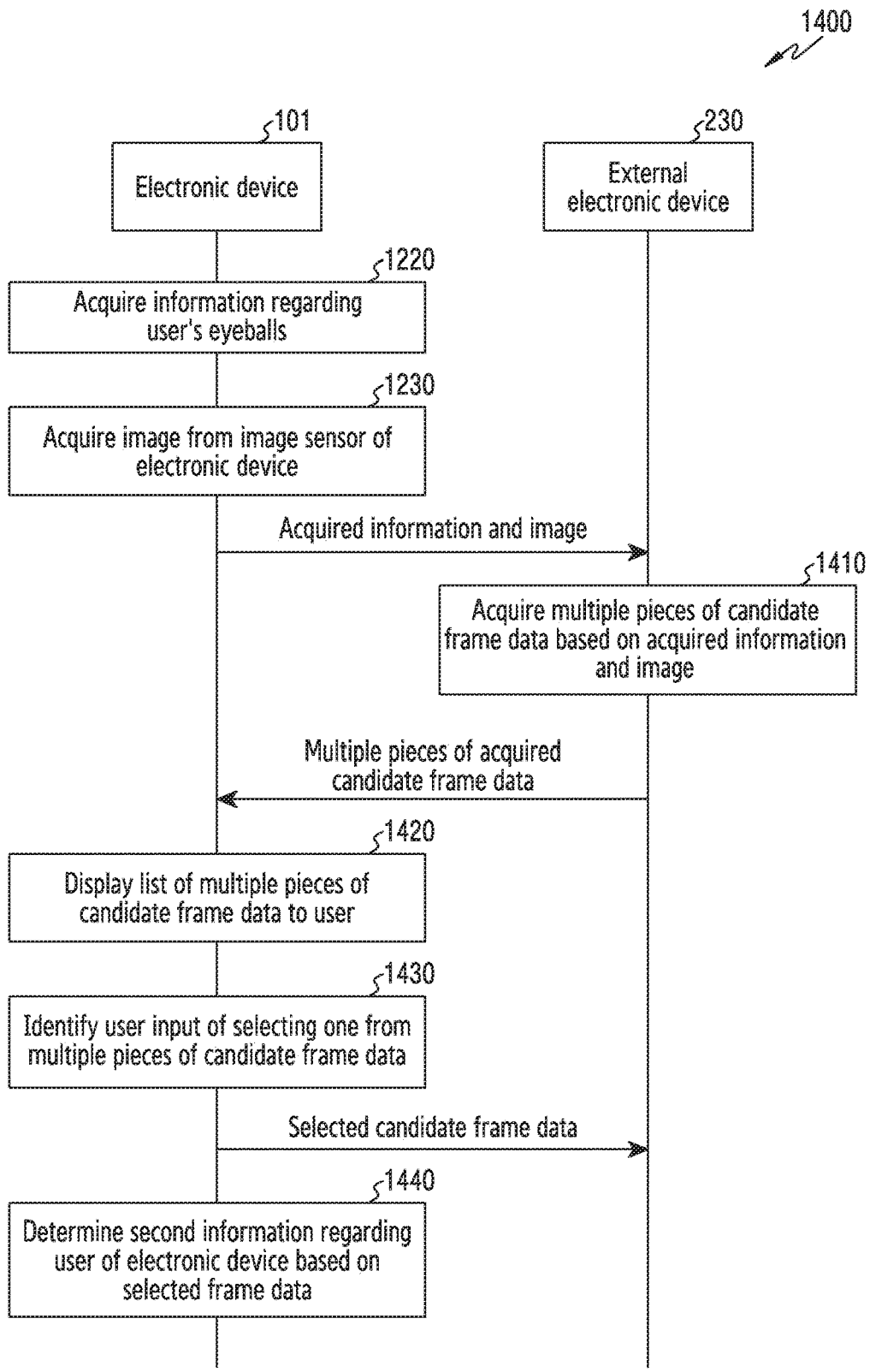
FIG. 14 is a flowchart illustrating operations of an electronic device according to an embodiment of the disclosure identifying second information regarding first frame data by using an external electronic device.

FIG. 14 is a flowchart 1400 illustrating operations of an electronic device 101 according to an embodiment of the disclosure identifying second information regarding first frame data by using an external electronic device 230. The electronic device 101 in FIG. 14 may correspond to the electronic device 101 in FIGS. 1 to 2. The external electronic device 230 in FIG. 14 may correspond to the external electronic device 230 in FIG. 2. The operations in FIG. 14 may be performed by the electronic device 101 and the external electronic device 230 in FIG. 2 or by the processors 120 and 250 in FIG. 2. At least some of the operations in FIG. 14 may be associated with the operations in FIG. 12.

Referring to FIG. 14, in operation 1220, the electronic device 101 according to various embodiments may acquire information regarding the user's eyes. In operation 1230, the electronic device 101 according to an embodiment may acquire image data from the image sensor included in the electronic device 101. Operations 1220 and 1230 may be performed similarly to operations 1220 and 1230 in FIG. 12.

Referring to FIG. 14, according to various embodiments, the electronic device 101 may transmit information and image data acquired from the external electronic device 230. In response to receiving information and image data from the electronic device 101, the external electronic device 230 according to an embodiment may acquire multiple pieces of candidate frame data based on the information and the image data, in operation 1410. The external electronic device 230 may correspond to a cloud server connected to multiple electronic devices including the electronic device 101. The external electronic device 230 may recommend first frame data to the user of the electronic device 101 based on the received image data.

According to various embodiments, the external electronic device 230 may identify multiple pieces of candidate frame data to be transmitted to the electronic device 101, based on information and image data collected from multiple electronic devices. For example, the external electronic device 230 may identify first frame data used by another user having information similar to that of the user of the electronic device 101 and/or first frame data used by another user viewing an image similar to that viewed by the user of the electronic device 101. The external electronic device 230 may transmit information regarding the identified first frame data to the electronic device 101 as candidate frame data. The external electronic device 230 may transmit an expert analysis corresponding to each of the multiple pieces of candidate frame data, a user review, a preview, or a combination thereof to the electronic device 101.

In response to receiving information regarding multiple pieces of candidate frame data, the electronic device 101 according to various embodiments may display a list of multiple pieces of candidate frame data on the display in operation 1420. The list of multiple pieces of candidate frame data may be provided to the user based on the UI in FIGS. 13B to 13C, for example.

In operation 1430, the electronic device 101 according to various embodiments may identify a user input of selecting one from the multiple pieces of candidate frame data. For example, the user may select one from the multiple pieces of candidate frame data by using the visual element 1320 in FIGS. 13B to 13C. For example, the user may select candidate frame data that enables the user to view the currently viewed image most comfortably. For example, the user may select candidate frame data that enables relatively better correction of color weakness and/or color blindness from the multiple pieces of candidate frame data.

According to various embodiments, in response to identification of a user input, the electronic device 101 may transmit information regarding the selected candidate frame data to the external electronic device 230. The transmitted information regarding the selected candidate frame data may be used by the external electronic device 230 to recommend candidate frame data to other users distinguished from the user of the electronic device 101.

In response to identification of a user input, the electronic device 101 according to various embodiments may determine second information regarding the user of the electronic device 101 based on the selected candidate frame data in operation 1440. For example, the second information may include data regarding the color and/or transparency of the selected candidate frame data. For example, the second information may include information regarding the user's eyes, acquired in operation 1220. For example, the second information may include image data acquired in operation 1230. For example, the second information may include data regarding a piece of candidate frame data other than the piece of candidate frame data selected from the multiple pieces of candidate frame data.

According to various embodiments, the second information determined in operation 1440 may be stored in the memory of the electronic device 101. The second information may be used to determine the color and/or transparency of the first frame data. In an embodiment, the first frame data may correspond to candidate frame data selected by the user from the multiple pieces of candidate frame data provided to the user by the external electronic device 230.

Figure 15:
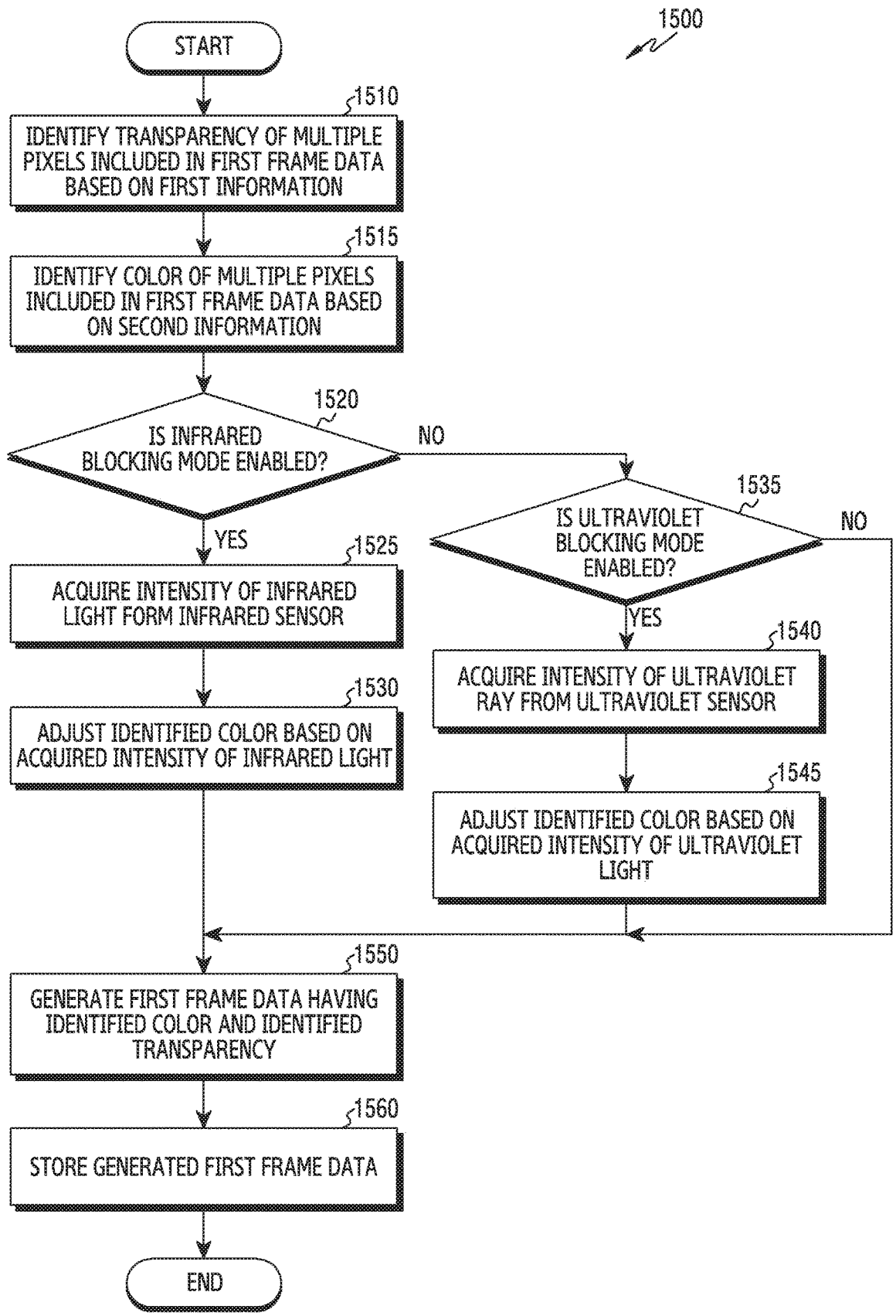
FIG. 15 is a flowchart illustrating operations of an electronic device according to an embodiment of the disclosure generating first frame data based on a mode and/or a state enabled by the user.

FIG. 15 is a flowchart 1500 illustrating operations of an electronic device according to an embodiment of the disclosure generating first frame data based on a mode and/or a state enabled by the user. The electronic device in FIG. 15 may correspond to the electronic device 101 in FIGS. 1 to 2. The operations in FIG. 15 may be performed by the electronic device 101 in FIGS. 1 to 2 or by the processor 120 in FIGS. 1 to in 2. The operations in FIG. 15 may be associated with operation 330 in FIG. 3. In the embodiment illustrated in FIG. 15, the electronic device may adjust the color of first frame data based not only on information regarding the user (for example, second information), but also on data measured by the infrared sensor and/or the ultraviolet sensor.

Referring to FIG. 15, in operation 1510, the electronic device according to various embodiments may identify the transparency of multiple pixels included in first frame data based on first information. The transparency may be determined based on the luminance of external light received by the luminance sensor of the electronic device. The transparency may be determined within a designated range (for example, 25% to 100%) based on the luminance. In operation 1515, the electronic device according to an embodiment may identify the color of multiple pixels included in the first frame data based on second information. The color may be determined based on information inputted from the user (for example, data regarding at least one of color weakness and/or color blindness). Operations 1510 and 1515 may be performed similarly to operations 310 and 320 in FIG. 3.

According to various embodiments, while the electronic device is used, the user may switch between multiple designated modes or designated states associated with first frame data. The designated modes may include a mode in which infrared rays are blocked preferentially (hereinafter, referred to as an infrared blocking mode) and/or a mode in which ultraviolet rays are blocked preferentially (hereinafter, referred to as an ultraviolet blocking mode). In response to receiving a user input for switching between the multiple designated modes or designated stated, the electronic device may change the color and/or transparency of the first frame data based on the switched mode or state.

In operation 1520, the electronic device according to various embodiments may determine whether or not the infrared blocking mode is enabled. The infrared blocking mode may be enabled based on the user's designated gesture and/or voice input. The electronic device may determine whether or not the infrared blocking mode is enabled, based on a parameter and/or a flag associated with the infrared blocking mode.

In response to identification of the enabled infrared blocking mode (Yes in 1520), the electronic device according to various embodiments may acquire the intensity of infrared light from the infrared sensor in operation 1525. The electronic device according to an embodiment may include not only a luminance sensor, but also an infrared sensor. The electronic device may measure the intensity of the infrared wavelength band of external light directed to the electronic device, based on data measured by the infrared sensor.

In response to acquisition of the intensity of infrared light, the electronic device according to various embodiments may adjust the color identified in operation 1515 based on the acquired intensity of infrared light, in operation 1530. In an embodiment, the electronic device may adjust the color identified in operation 1515 based on mapping data as given in Table 1 below:

TABLE 1

| Color | Ultraviolet blocking ratio | Infrared blocking ratio |
|---|---|---|
| Colorless | 7% | 7% |
| Pink | 20% | 10% |
| Blue | 95% | 12% |
| Yellow | 65% | 10% |
| Green | 90% | 90% |
| Brown | 95% | 50% |
| Gray | 80% | 40% |

In an embodiment, while the infrared blocking mode is enabled, the color identified in operation 1515 may be changed based on the infrared blocking ratios in Table 1. For example, when the color identified in operation 1515 is yellow, the electronic device may compare the infrared blocking ratio (10%) of yellow color with the threshold (for example, 40%) of the infrared blocking ratio corresponding to the infrared blocking mode. Since the infrared blocking ratio (10%) of yellow color is below the threshold, the electronic device may change the identified color to a color having a relatively high infrared blocking ratio. For example, the electronic device may change the identified color to one of gray color, brown color, and/or green color having infrared blocking ratios equal to or higher than the threshold. In an embodiment, while the infrared blocking mode is enabled, the color identified in operation 1515 may be changed based on the infrared blocking ratios in Table 1 and the intensity of infrared light acquired in operation 1525. For example, based on the infrared blocking ratio corresponding to the identified color, the electronic device may identify the extent to which the intensity of infrared light acquired in operation 1525 is attenuated by the identified color. When the attenuated intensity of light is equal to or higher than a designated threshold corresponding to the infrared blocking mode, the electronic device may change the identified color to a different color having a relatively high infrared blocking ratio.

In response to identification of the disabled infrared blocking mode (No in 1520), the electronic device according to various embodiments may determine in operation 1535 whether or not the ultraviolet blocking mode is enabled. The ultraviolet blocking mode may also be enabled based on the user's designated gesture and/or voice input.

In response to identification of the enabled ultraviolet blocking mode (Yes in 1535), the electronic device according to various embodiments may acquire the intensity of ultraviolet light from the ultraviolet sensor in operation 1540. The electronic device according to an embodiment may include not only a luminance sensor, but also an ultraviolet sensor. The electronic device may measure the intensity of the ultraviolet wavelength band of external light directed to the electronic device, based on data measured by the ultraviolet sensor.

In response to acquisition of the intensity of ultraviolet light, the electronic device according to various embodiments may adjust the identified color based on the acquired intensity of ultraviolet light in operation 1545. The color identified in operation 1515 may be changed based on ultraviolet blocking ratios given in Table 1. For example, when the color identified in operation 1515 is pink, the electronic device may compare the ultraviolet blocking ratio (20%) of pink color with the threshold (for example, 40%) of the ultraviolet blocking ratio corresponding to the ultraviolet blocking mode. Since the ultraviolet blocking ratio of pink color is below the threshold, the electronic device may change the identified color to a different color having a relatively high ultraviolet blocking ratio. For example, the electronic device may change the identified color to one of gray color, brown color, and/or green color having ultraviolet blocking ratios equal to or higher than the threshold.

In an embodiment, while the ultraviolet blocking mode is enabled, the color identified in operation 1515 may be changed based on the ultraviolet blocking ratios in Table 1 and the intensity of ultraviolet light acquired in operation 1540. For example, the electronic device may apply an ultraviolet blocking ratio corresponding to the identified color to the intensity of ultraviolet light acquired in operation 1540, thereby calculating the intensity of ultraviolet light after passing through the display having the identified color. When the calculated intensity of ultraviolet light is equal to or higher than a designated threshold corresponding to the ultraviolet blocking mode, the electronic device may change the color identified in operation 1515 to a different color having a relatively high ultraviolet blocking ratio.

In operation 1550, the electronic device according to various embodiments may generate first frame data having adjusted color and identified transparency. The transparency of the first frame data may correspond to the transparency identified in operation 1510. When neither the infrared blocking mode nor the ultraviolet blocking mode is enabled (No in 1535), the color of the first frame data may correspond to the color identified in operation 1515. When the infrared blocking mode is enabled, the color of the first frame data may correspond to the color adjusted in operation 1530. When the ultraviolet blocking mode is enabled, the color of the first frame data may correspond to the color adjusted in operation 1545.

In response to generation of the first frame data, the electronic device according to various embodiments may store the generated first frame data in operation 1560. The first frame data may be stored in a designated area (for example, the first buffer area 810 in FIG. 8) inside the memory. The electronic device may control the multiple pixels of the display based on the generated first frame data. In an embodiment, the color and/or transparency of the multiple pixels of the display may correspond to the color and/or transparency of the multiple pixels of the first frame data.

Figure 16:
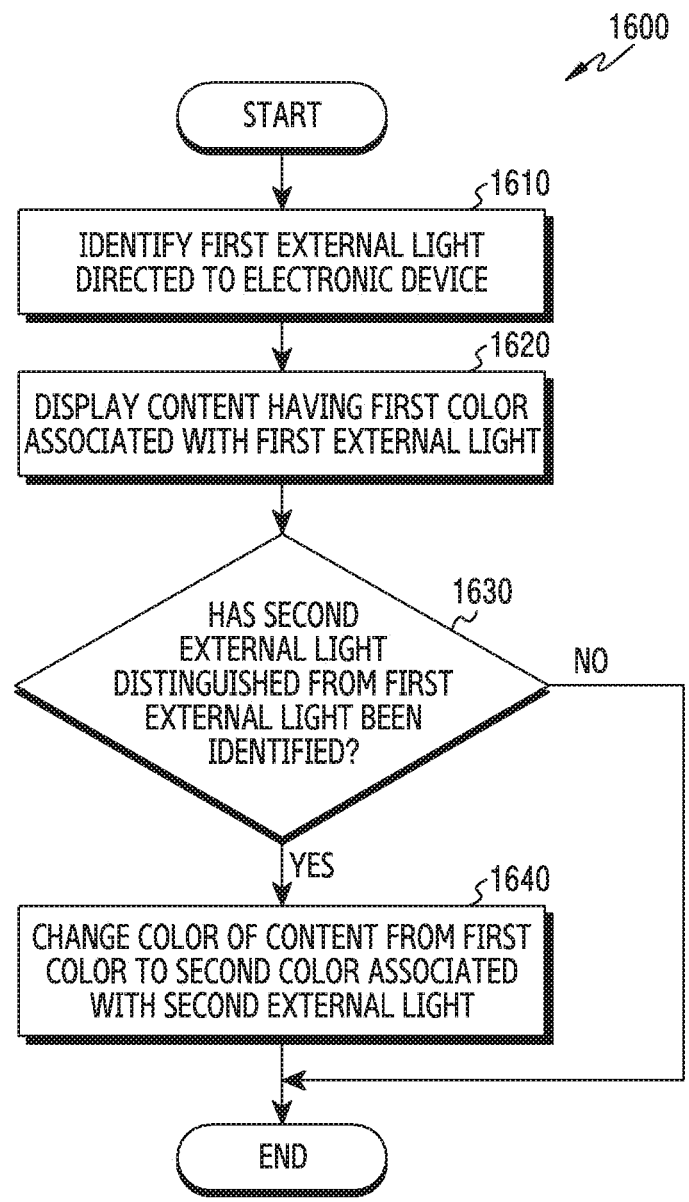
FIG. 16 is a flowchart illustrating operations of an electronic device according to an embodiment of the disclosure changing the color of content provided to the user according to a change in external light.

FIG. 16 is a flowchart 1600 illustrating operations of an electronic device according to an embodiment of the disclosure changing the color of content provided to the user according to a change in external light. The electronic device in FIG. 16 may correspond to the electronic device 101 in FIGS. 1 to 2. The operations in FIG. 16 may be performed by the electronic device 101 in FIGS. 1 to 2 or by the processor 120 in FIGS. 1 to in 2. The operations in FIG. 16 may be associated with operations in FIG. 3.

Referring to FIG. 16, in operation 1610, the electronic device according to various embodiments may identify first external light directed to the electronic device. The electronic device may identify the first external light based on the luminance sensor, the ultraviolet sensor, the infrared sensor, and/or the image sensor. In response to identification of the first external light, the electronic device may acquire first information regarding the first external light. The first information may be acquired based on operation 310 in FIG. 3, for example. The first information may include data regarding the luminance of the first external light.

In response to identification of the first external light, the electronic device according to various embodiments may display content having a first color associated with the first external color on the display in operation 1620. In an embodiment, the electronic device may acquire frame data based on a designated color associated with the user and the first external light. The electronic device may identify the first color at least partially based on the color of the frame data acquired based on the luminance of the first external light and the designated color. For example, the first color may correspond to the complementary color of the designated color. The designated color may be associated with one or more parameters associated with the user's color weakness and/or color blindness.

According to various embodiments, the display may be disposed in front of both eyes of the user of the electronic device so as to transmit first external light to both eyes of the user. The electronic device may display the content on the display while being superimposed on the acquired frame data. The content may be acquired from an application executed by the processor, and may be associated with an augmented reality service provided to the user of the electronic device. The acquired frame data may correspond to the first frame data in FIG. 3, and the content may be included in the second frame data in FIG. 3.

While displaying content having a first color, the electronic device according to various embodiments may determine in operation 1630 whether or not second external light distinguished from the first external light has been identified. When the user moves while wearing the electronic device, or when the user's peripheral environment is changed, the electronic device may identify second external light distinguished from the first external light. The second external light may also be identified based on the luminance sensor, the ultraviolet sensor, the infrared sensor, and/or the image sensor, as in the case of the first external light. The color and/or luminance of the second external light may differ from the color and/or luminance of the first external light.

In response to identification of the second external light (Yes in 1630), the electronic device according to various embodiments may change the color of the content from the first color to a second color associated with the second external light in operation 1640. When the second external light fails to be identified (No in 1630), the electronic device according to various embodiments may not maintain the color of the content to the second color, but may maintain the first color. In an embodiment, in response to identification of the second external light, the electronic device may change the color and/or transparency of the frame data based on the designated color and the luminance of the second external light. The electronic device may identify the second color based on the color and/or transparency of the changed frame data. For example, the second color may correspond to the complementary color of the color of the changed frame data.

According to various embodiments, in response to a change in the external light on the periphery of the user (for example, change from the first external light to the second external light), the electronic device may differently change the color of content associated with the augmented reality service outputted on the display. Accordingly, in spite of the change in the external light passing through the display, the user may clearly identify the content provided from the electronic device.

Figure 17:
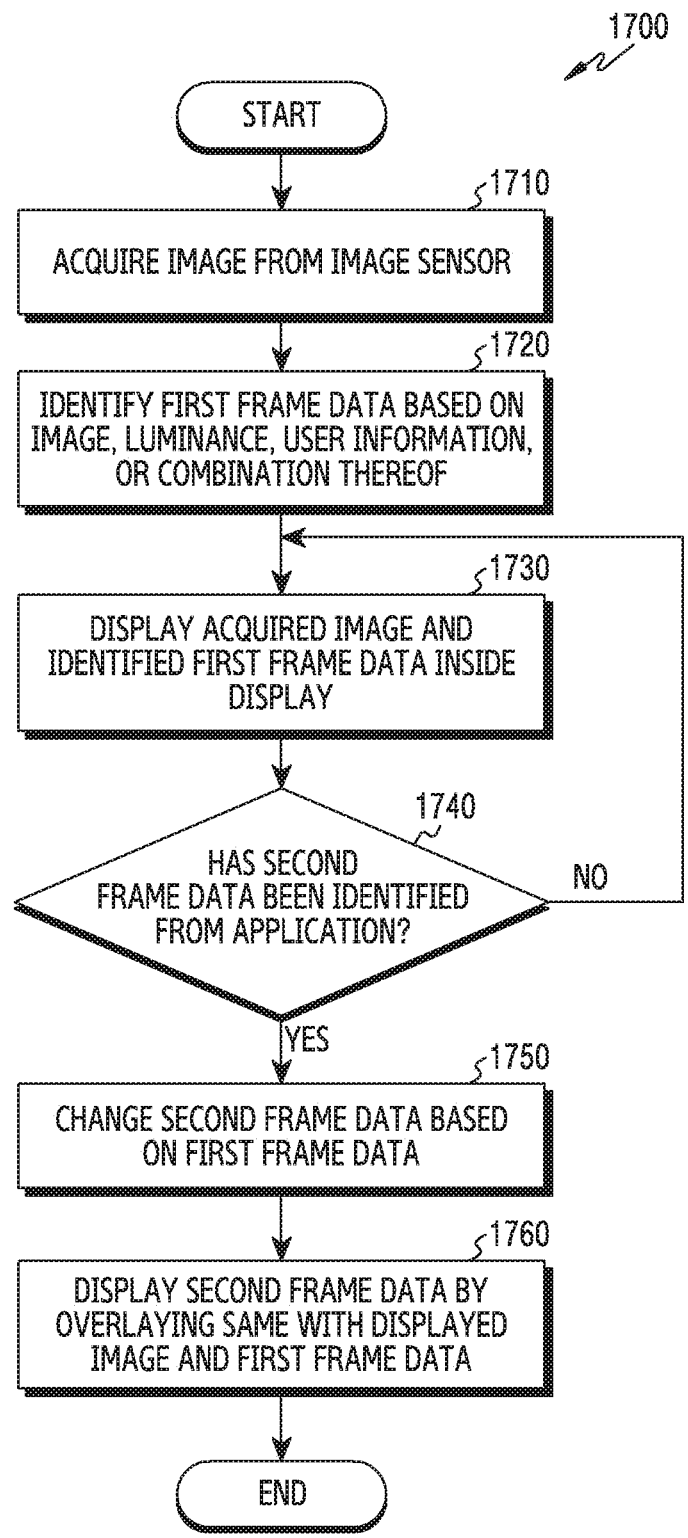
FIG. 17 is a flowchart illustrating operations of an electronic device according to an embodiment of the disclosure generating first frame data and second frame data based on an image acquired from an image sensor.

FIG. 17 is a flowchart 1700 illustrating operations of an electronic device according to an embodiment of the disclosure generating first frame data and second frame data based on an image acquired from an image sensor. In an embodiment in which the electronic device corresponds to a smartphone and/or a smart pad, external light directed to the first surface of the electronic device may not be transmitted to the second surface, which includes a display, which is viewed by the user, and which is opposite to the first surface, but may be blocked by the first surface of the electronic device. In an embodiment in which the electronic device corresponds to a smartphone and/or a smart pad, the electronic device may display not only the above-mentioned first frame data and/or second frame data, but also image data acquired from the image sensor, on the display, in order to provide an augmented reality service to the user.

Referring to FIG. 17, in operation 1710, the electronic device according to an embodiment may acquire an image from the image sensor. The image sensor may be disposed on the first surface so as to acquire external light directed to the first surface. The acquired image may be processed by an application which is currently executed by the electronic device, and which is for the purpose of providing an augmented reality service.

In operation 1720, the electronic device according to an embodiment may identify first frame data based on the image acquired in operation 1710, luminance, user information, or a combination thereof. The luminance may be identified from the image acquired from the image sensor and/or data measured by the luminance sensor included in the electronic device. The user information refers to information regarding the user of the electronic device, and may include, for example, the user's eyesight, whether or not the user has astigmatism, whether or not the user has myopia, whether or not the user has hypermetropia, color weakness, color blindness, or a combination thereof. The first frame data may be identified based on operation 330 in FIG. 3 or the operations in FIGS. 7A to 7B.

In operation 1730, the electronic device according to an embodiment may display the image acquired in operation 1710 and the first frame data identified in operation 1720, on the display. In an embodiment, the electronic device may display the image and the first frame data on the display so as to overlap. For example, the electronic device may display the image and the first frame data such that the first frame data is superimposed on the image.

While displaying the image and the first frame data, the electronic device according to an embodiment may determine in operation 1740 whether or not second frame data has been identified from an application. The application may correspond to an application for providing an augmented reality service. The second frame data may include the result of identifying an external object captured on an image and/or content acquired by accessing a web service (for example, search engine) based on the identified external object.

In response to identification of the second frame data (Yes in 1740), the electronic device according to an embodiment may change the second frame data based on the first frame data in operation 1750. When the second frame data fails to be identified (No in 1740), the electronic device according to an embodiment may maintain display of the first frame data without the second frame data. In an embodiment, the electronic device may change the color and/or transparency of at least one of multiple pixels included in the second frame data based on operation 360 in FIG. 3 or the operations in FIG. 9. For example, the color of at least one of multiple pixels included in the second frame data may be changed to the complementary color of the color of multiple pixels included in the first frame data.

In operation 1760, the electronic device according to an embodiment may display the changed second frame data by overlaying the same with the displayed image and first frame data. For example, content included in the second frame data may be displayed on the display to be superimposed on the image and the first frame data. The color of the content included in the second frame data corresponds to the complementary color of the color of multiple pixels included in the first frame data, based on operation 1750, such that the user can clearly recognize the content.

Figure 18:
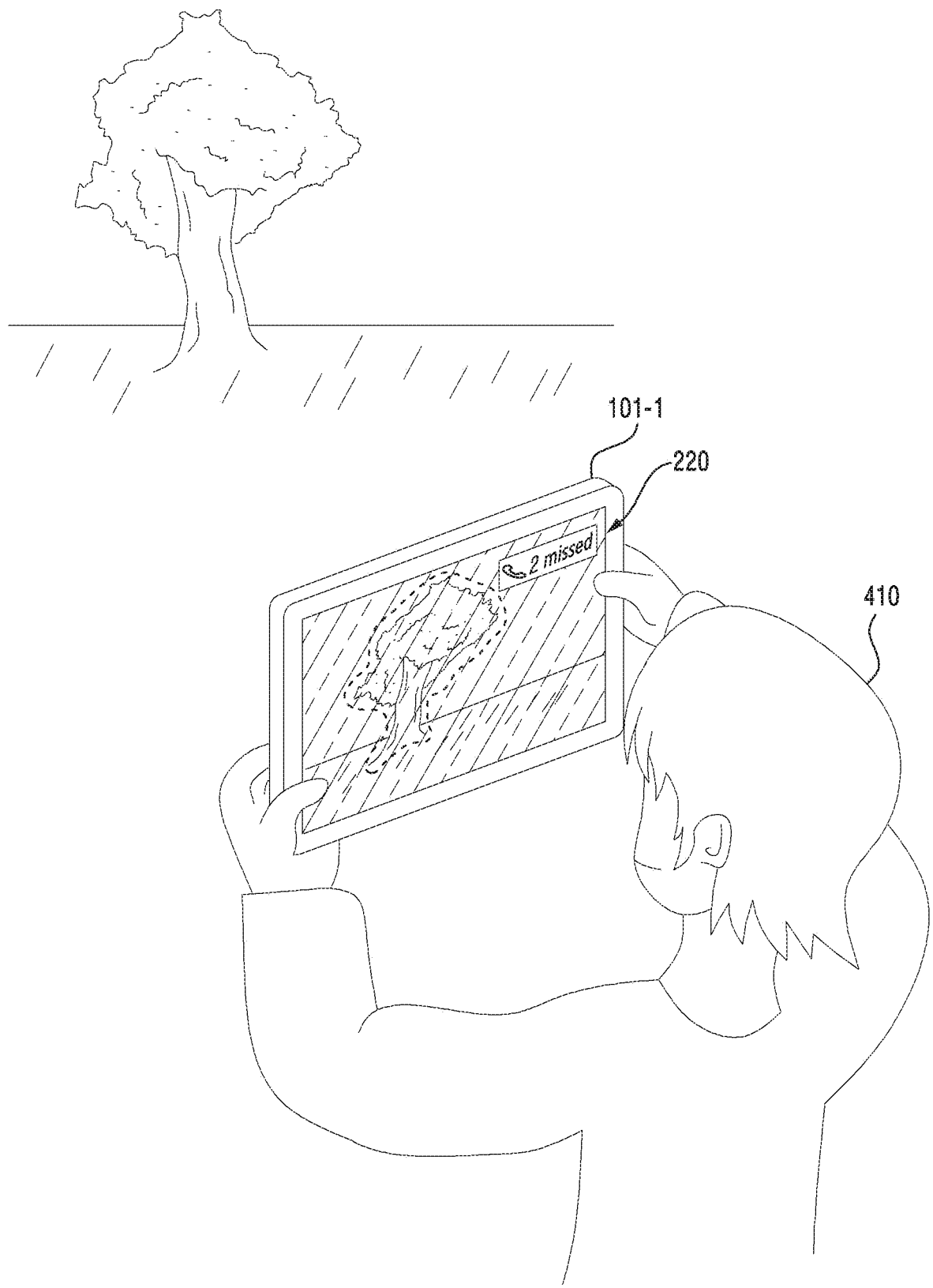
FIG. 18 is a diagram illustrating a situation in which an electronic device according to an embodiment of the disclosure provides the user with an augmented reality service.

FIG. 18 is a diagram illustrating a situation in which an electronic device 101-1 according to an embodiment of the disclosure provides a user 410 with an augmented reality service. The electronic device 101-1 in FIG. 18 may correspond to the electronic device 101 in FIGS. 1 to 2. The electronic device 101-1 in FIG. 18 may correspond to a smartphone and/or a smart pad. The electronic device 101-1 in FIG. 18 may provide the user 410 with an augmented reality service based on the operations in FIG. 17.

Referring to FIG. 18, the user 410 of the electronic device 101-1 may move the electronic device 101-1 such that the camera module and/or the image sensor of the electronic device 101-1 face an external object. In response to acquiring an image from the image sensor, the electronic device 101-1 may control multiple pixels included in the display 220 based on the operations in FIG. 17. In this case, the electronic device 101-1 may display the first frame data and/or the second frame data in FIG. 17 to be superimposed on the image acquired from the image sensor, inside the display 220.

In an embodiment, the size of the first frame data may correspond to the size of the entire area of the display 220. As the electronic device 101-1 displays first frame data on the display to be superimposed on the image, the color of the image may be shifted by the color of multiple pixels included in the first frame data, and may be attenuated by the transparency and/or alpha value of multiple pixels included in the first frame data. The second frame data includes content associated with an external object such that, as the electronic device 101-1 displays second frame data on the display to be superimposed on the image and the first frame data, the user 410 can view the content together with the image having a color shifted based on the first frame data.

According to various embodiments, the electronic device 101-1 may adjust the color and/or transparency of the display based on various types of outdoor external light. The electronic device 101-1 may adjust the color and/or transparency of the display based on information regarding both eyes of the user 410. The electronic device 101-1 may determine the color of content associated with the augmented reality to be provided to the user 410, based on the adjusted color and/or transparency of the display. As multiple pixels of the display are adjusted based on information regarding the user 410 and external environment, the user 410 can view the external object and content displayed inside the display 220 more clearly.

According to various embodiments, the electronic device 101-1 may transmit information regarding the adjusted color and/or transparency of the display to an external electronic device (for example, external electronic device 230 in FIG. 2) or may share the information therewith. When the user 410 owns multiple electronic devices (for example, the electronic device 101-1 in FIG. 18 corresponding to a smartphone and the electronic device 101 in FIGS. 4A to 4B corresponding to an HMD), information regarding the adjusted color and/or transparency of the display may be shared between the multiple electronic devices.

Methods according to embodiments described in the claims or specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

An electronic device according to various embodiments and a method thereof change the color and/or transparency of a display based on external light such that the user can clearly recognize content associated with augmented reality.

An electronic device according to various embodiments and a method thereof change the color and/or transparency of a display based on information regarding the user's both eyes (for example, information regarding color weakness or color blindness) such that the user can clearly recognize not only content associated with augmented reality, but also external light.

Effects which can be acquired by the disclosure are not limited to the above described effects, and other effects that have not been mentioned may be clearly understood by those skilled in the art from the following description.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a sensor;
a memory; and
at least one processor operably connected to the display, the sensor, and the memory,
wherein the at least one processor is configured to:
in response to identifying that the electronic device is being worn by a user, identify first information regarding external light directed to the electronic device by using the sensor,
based on the first information regarding external light and second information regarding the user, acquire first frame data,
in response to acquiring the first frame data, control the display to display the first frame data,
identify second frame data distinguished from the first frame data from an application stored in the memory while the first frame data is displayed on the display,
in response to identifying the second frame data, adjust a color of at least one of multiple pixels included in the second frame data at least partially based on the first frame data, and
control the display based on at least one of the first frame data or the adjusted second frame data.

2. The electronic device of claim 1, wherein the at least one processor is further configured to:
identify transparency of multiple pixels included in the first frame data, based on a luminance of the external light included in the first information, and
identify a color of the multiple pixels included in the first frame data based on the second information.

3. The electronic device of claim 1, wherein the second information comprises at least one parameter associated with color weakness or color blindness of the user.

4. The electronic device of claim 1, wherein the first frame data corresponds to frame data selected by the user from multiple pieces of frame data provided to the user based on the second information by an external electronic device distinguished from the electronic device.

5. The electronic device of claim 1, wherein the at least one processor is further configured to change a second color of the at least one of multiple pixels included in the second frame data to a third color corresponding to a complementary color of a first color, based on the first color of at least one of multiple pixels included in the first frame data.

6. The electronic device of claim 1, further comprising:
an image sensor configured to capture an external object,
wherein the at least one processor is further configured to:
acquire image data regarding the external object captured by the image sensor, and
in response to identifying a brightness of the external object based on the image data, adjust a color or a transparency of at least one pixel corresponding to the external object among multiple pixels included in the first frame data.

7. The electronic device of claim 6, wherein the at least one pixel corresponding to the external object is included in a part of the first frame data overlapping the external object, while the first frame data is displayed on the display.

8. The electronic device of claim 1, wherein the at least one processor is further configured to control the display such that the second frame data is displayed so as to be overlaid with the first frame data.

9. The electronic device of claim 1,
wherein the display is disposed adjacent to eyes of the user while the electronic device is being worn by the user, and
wherein the display transmits external light to the eyes of the user.

10. The electronic device of claim 9,
wherein the application is configured to generate the second frame data to comprise content associated with an external object identified based on the external light, and
wherein a location of the content inside the second frame data corresponds to a location on the display where light of the external object penetrates through.

11. An electronic device comprising:
a display;
a sensor;
a memory; and
at least one processor operably connected to the display, the sensor, and the memory,
wherein the at least one processor is configured to:
  identify first external light directed to the electronic device by using the sensor,
  based on the first external light identified, control the display to display content having a first color associated with the first external light, the content being acquired from an application executed by the at least one processor,
  identify second external light distinguished from the first external light by using the sensor, while the content having the first color is displayed, and
  in response to identifying the second external light, change a color of the content displayed on the display from the first color to a second color associated with the second external light.

12. The electronic device of claim 11, wherein the at least one processor is further configured to:
  acquire frame data based on a designated color associated with a user of the electronic device and a luminance of the first external light, and
  control the display to display the content so as to be superimposed on the acquired frame data.

13. The electronic device of claim 12, wherein the at least one processor is further configured to identify the designated color based on at least one parameter associated with a color weakness or a color blindness of the user.

14. The electronic device of claim 12, wherein the at least one processor is further configured to identify the first color at least partially based on a color of the frame data acquired based on the designated color and the luminance of the first external light.

15. The electronic device of claim 12, wherein the at least one processor is further configured to:
  in response to identifying the second external light, change the frame data based on the designated color and the luminance of the second external light, and
  identify the second color at least partially based on a color of the changed frame data.

16. A method of an electronic device, the method comprising:
  identifying that a user is wearing the electronic device;
  in response to identifying that the user is wearing the electronic device, identifying first information indicating a luminance of external light directed to the electronic device by using a sensor of the electronic device;
  based on the first information indicating the luminance and second information regarding the user, acquiring first frame data;
  in response to acquiring the first frame data, controlling a display of the electronic device to display the first frame data;
  identifying second frame data distinguished from the first frame data from an application stored in a memory of the electronic device, while the first frame data is displayed on the display;
  in response to identifying the second frame data, adjusting a color of at least one of multiple pixels included in the second frame data at least partially based on the first frame data; and
  controlling the display based on at least one of the first frame data or the adjusted second frame data.

17. The method of claim 16, wherein the acquiring of the first frame data comprises:
  acquiring a transparency of multiple pixels included in the first frame data based on the first information; and
  acquiring a color of the multiple pixels included in the first frame data based on the second information.

18. The method of claim 17, wherein the second information comprises at least one parameter associated with a color weakness or a color blindness of the user.

19. The method of claim 17, wherein the adjusting of the color of the at least one of multiple pixels comprises:
  changing a second color of the at least one of multiple pixels included in the second frame data, based on a first color of at least one of multiple pixels included in the first frame data, to a third color corresponding to a complementary color of the first color.

20. The method of claim 16, wherein the controlling of the display based on at least one of the first frame data or the adjusted second frame data comprises:
  controlling the display such that the second frame data is displayed so as to be overlaid with the first frame data.

* * * * *